INVENTOR:
Otto Haberkorn
By
OSTROLENK, FABER, GERB & SOFFEN
ATTORNEYS

INVENTOR:
Otto Haberkorn
By Ostrolenk, Faber, Gerb & Soffen
ATTORNEYS

INVENTOR:

By Otto Haberkorn

Ostrolenk, Faber, Gerb & Soffen

ATTORNEYS

INVENTOR:
By Otto Haberkorn
Ostrolenk, Faber, Gerb & Soffen
ATTORNEYS

March 26, 1968 O. HABERKORN 3,374,946

COMPUTER FOR MULTIPLICATION WITH ABBREVIATED, CONTINUAL ADDITION OR SUBTRACTION

Filed Aug. 9, 1965 11 Sheets-Sheet 5

INVENTOR:

Otto Haberkorn

By OSTROLENK, FABER, GERB & SOFFEN

ATTORNEYS

INVENTOR:

Otto Haberkorn

By

OSTROLENK, FABER, GERB & SOFFEN

ATTORNEYS

INVENTOR:
Otto Haberkorn
BY
OSTROLENK, FABER, GERB & SOFFEN
ATTORNEYS

INVENTOR:

By Otto Haberkorn

OSTROLENK, FABER, GERB & SOFFEN

ATTORNEYS

March 26, 1968 O. HABERKORN 3,374,946

COMPUTER FOR MULTIPLICATION WITH ABBREVIATED, CONTINUAL ADDITION OR SUBTRACTION

Filed Aug. 9, 1965

11 Sheets-Sheet 9

INVENTOR:

By Otto Haberkorn

OSTROLENK, FABER, GERB & SOFFEN

ATTORNEYS

March 26, 1968 O. HABERKORN 3,374,946
COMPUTER FOR MULTIPLICATION WITH ABBREVIATED, CONTINUAL ADDITION OR SUBTRACTION
Filed Aug. 9, 1965 11 Sheets-Sheet 10
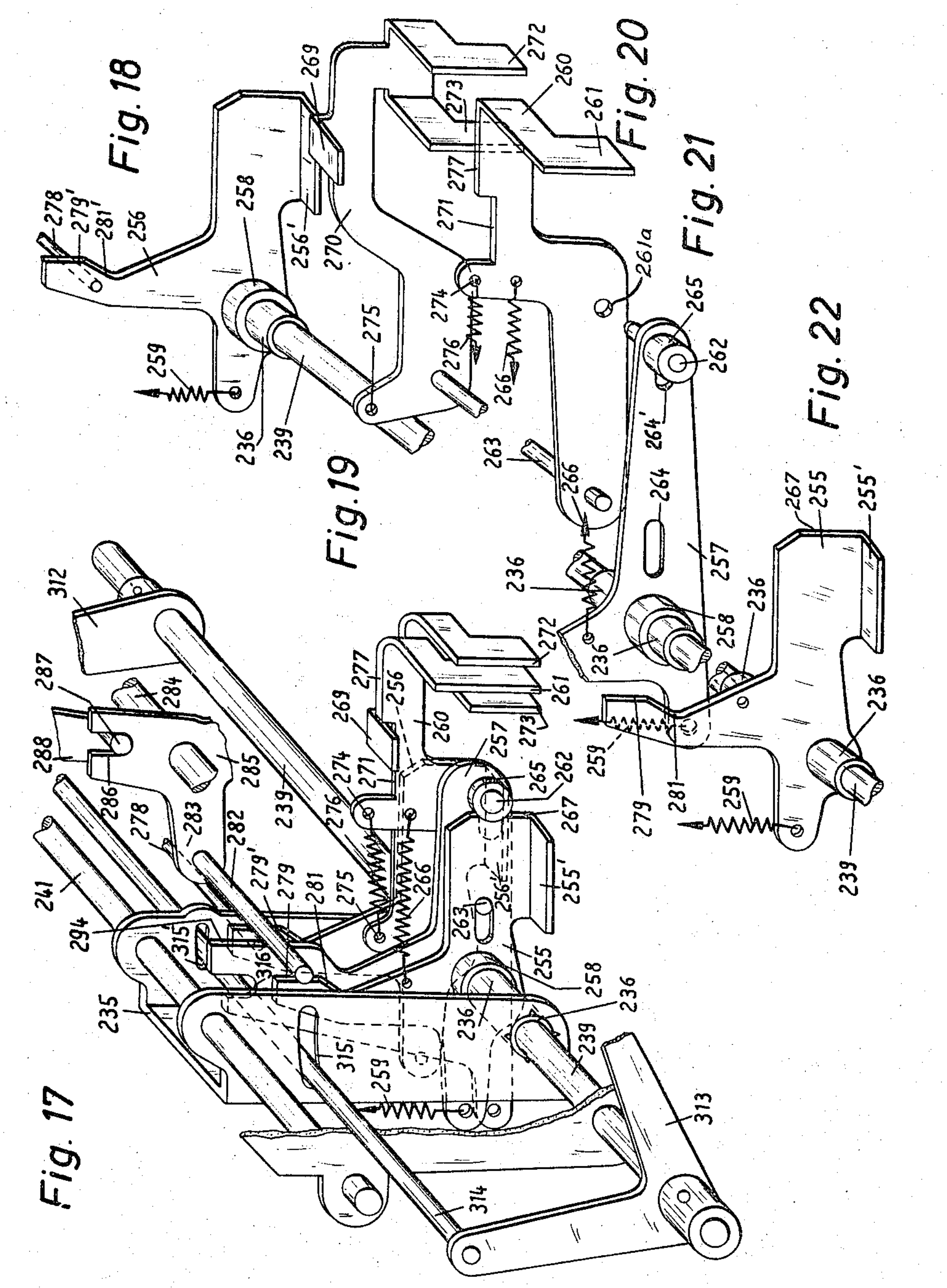
INVENTOR:
Otto Haberkorn
By Ostrolenk, Faber, Gerb & Soffen
ATTORNEYS INVENTOR:
Otto Haberkorn
By Ostrolenk, Faber, Gerb & Soffen
ATTORNEYS 3,374,946
Patented Mar. 26, 1968

3,374,946

COMPUTER FOR MULTIPLICATION WITH ABBREVIATED, CONTINUAL ADDITION OR SUBTRACTION

Otto Haberkorn, Gerstetten, Wurttemberg, Germany, assignor to Walther Buromaschinen G.m.b.H.

Filed Aug. 9, 1965, Ser. No. 478,050
Claims priority, application Germany, Aug. 7, 1964, W 37,344
24 Claims. (Cl. 235—60)

The instant invention relates to calculating machines and more particularly to a novel calculator for automatically performing multiplications and requiring fewer operations than conventional calculators, wherein sequential addition or subtraction of the multiplicand and the number of such operations are performed for each decimal of the multiplier, corresponding to the value of the individual multiplier numbers 1 to 5 or, respectively, to the complementary value to 10 or 9 of the individual multiplier numbers 6 to 9.

Compared to machines operating with ordinary sequential addition, calculators employing addition and/or subtraction steps in the performance of multiplication offer the advantage that the number of operations required for a given multiplicand is generally substantially smaller. It is the object of the present invention to reduce the required number of operations even further.

This is brought about by the fact that, according to the invention, a reduction of the overall number of operations corresponding to given multiplier digit values, results by performing the additions or subtractions of the multiplicand, for each multiplier figure, in two or more distributor counting-registers.

For this purpose one uses per se known multiplier members assigned to the decimal places of the multiplier, adjustable to the numerical values of the multiplier, and herebelow designed as "mult-members" which indicate respectively, one sensor-scanned row of descending steps with growing multiplier numerical value for the numerals 1 to 5 and another row of ascending steps for the numerals 6 to 9, where the elevation spacings of adjacent descending or ascending steps are identical and each sensed step level corresponds to one operation.

In this operation, according to the invention, each step (with the exception of the step for the multiplier FIGURE 5) is assigned a number, corresponding to the number of the distributor counting-registers used, of the multiplier figures following one another in the natural series, and means are provided so that, for each given multiplier figure, the multiplicand will in each distribution operation be introduced additively or subtractively not more than once, and that the number of the introductions of the multiplicand into the distributor counting-registers occurring during each operation, except into the first distributor counting-register, reduces the number of required machine operations that would correspond to the number of index figures in the multiplier.

Figure 1:
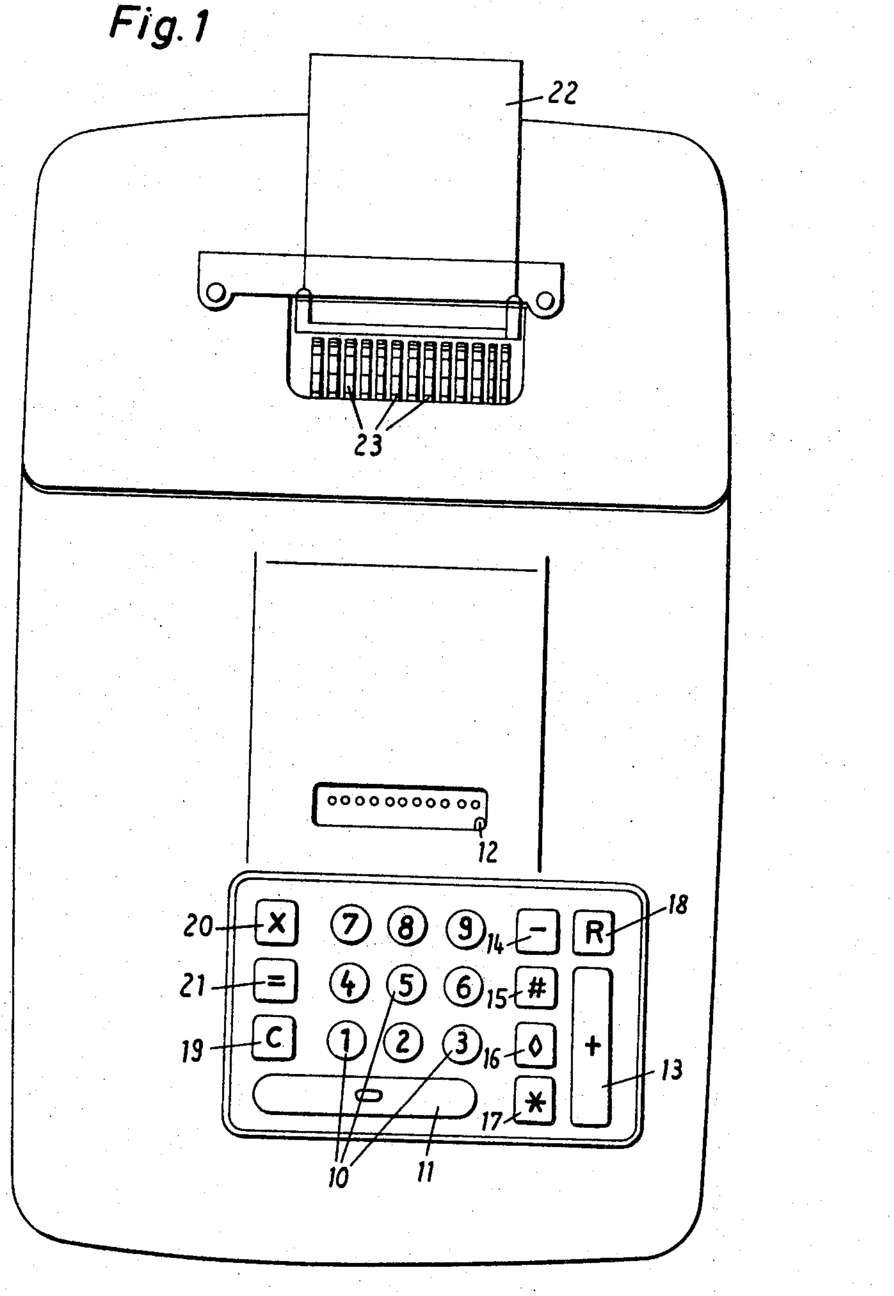
Figures 2, 4:
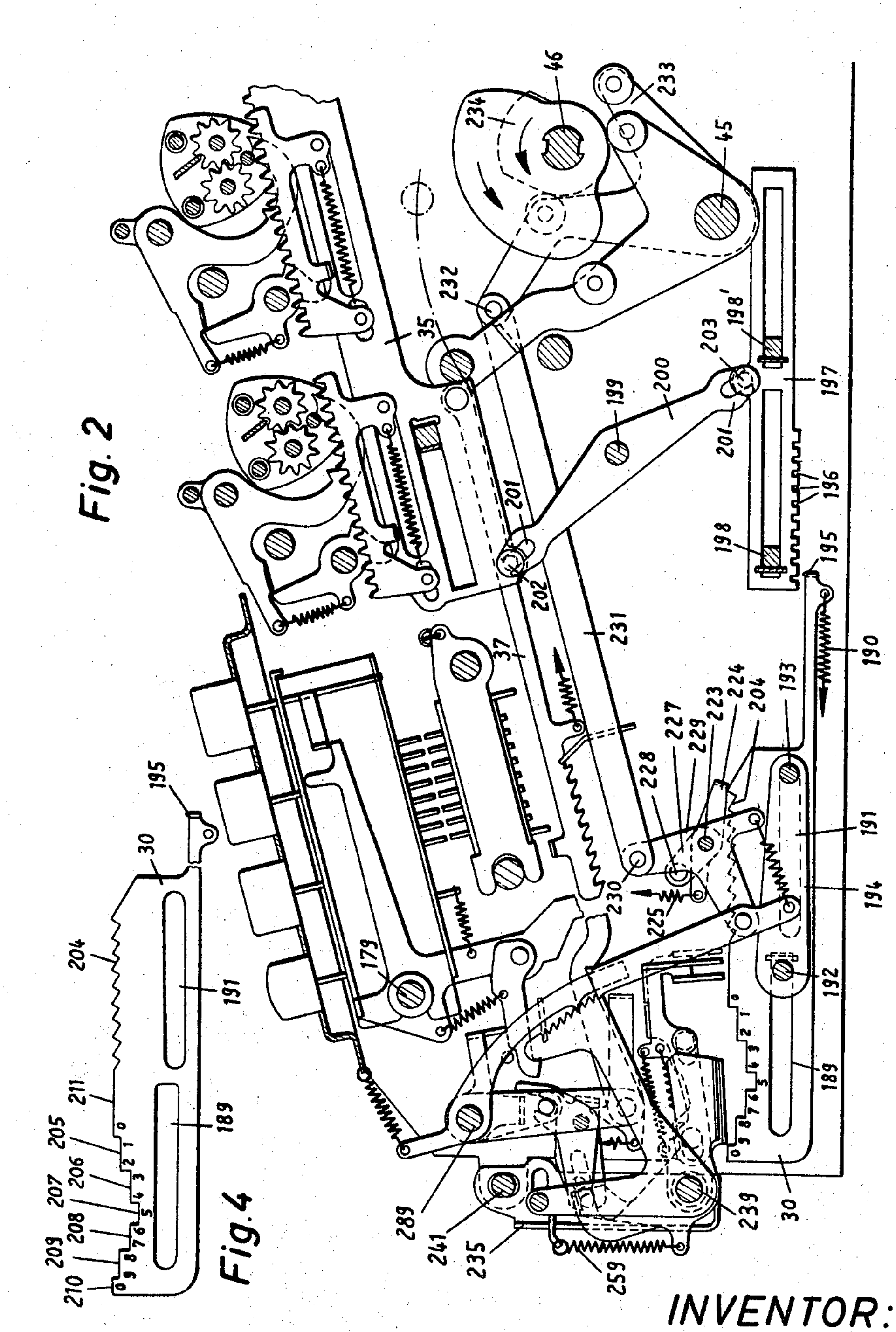
Figure 3:
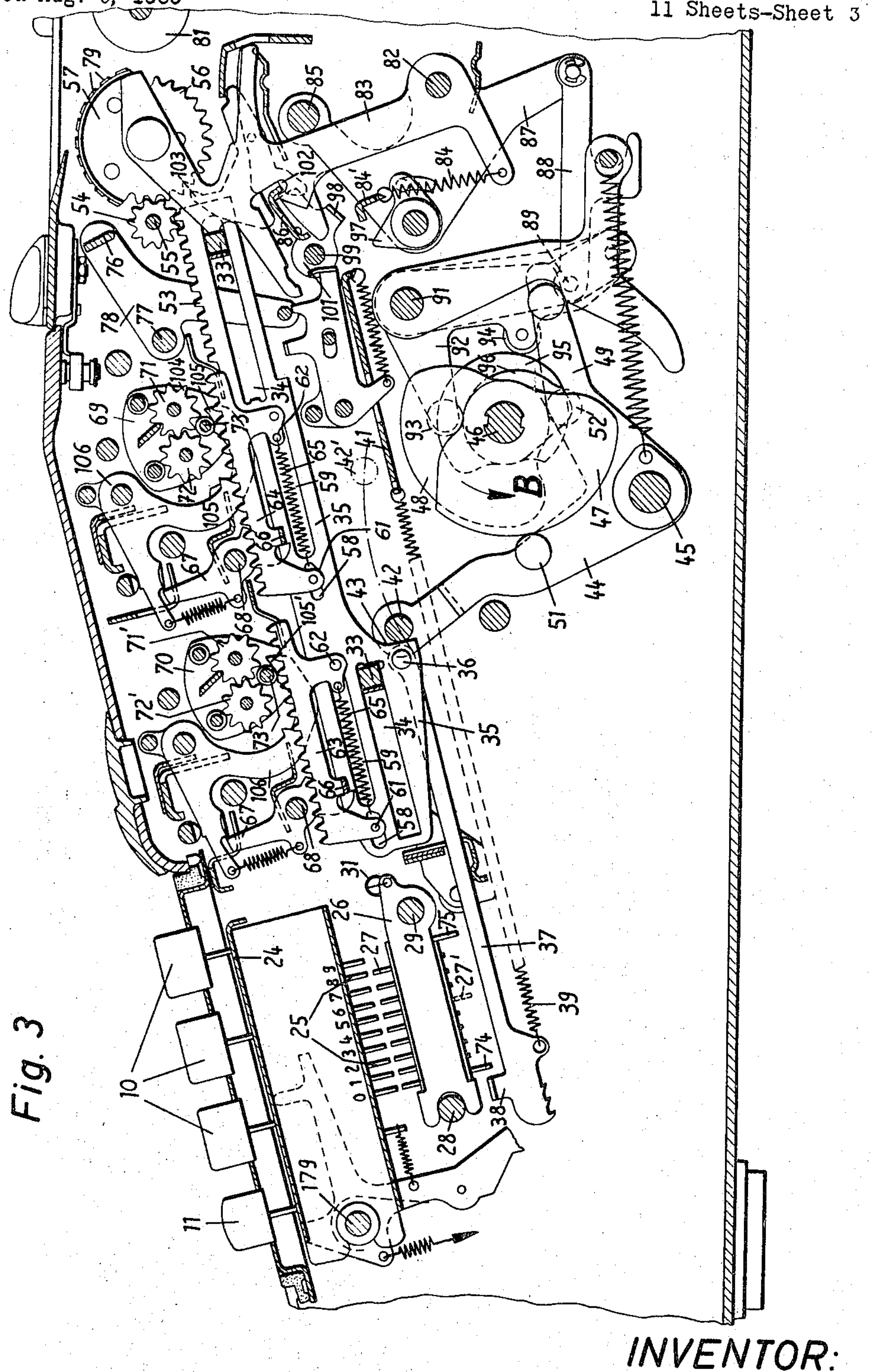

In this process, in using two distributor counting-registers, the multiplier FIGURES 1 and 2 as well as 6 and 7 are assigned steps with one scanning depth each of one step elevation, beginning from the scanning depth 0, the multiplier FIGURES 3 and 4 as well as 8 and 9 are assigned a scanning depth corresponding to two step elevations, and the number 5 only is assigned a step having a scanning depth of three step elevations, whereas the multiplier value 0 is assigned a step with a scanning depth of 0.

To facilitate an understanding of this invention, an explanation is furnished below, first, of the sequence of the solution of a multiplictaion problem with the various methods hitherto used, by comparison with the sequential addition method of the invention, by means of a multiplication example: 152×3826=581552:

A. STANDARD SEQUENTIAL ADDITION

[20 revolutions]

| | |
|---|---|
| 152 ·3826+581, 552 | |
| (6)+152 · 6= | 912 |
| (2)+152 · 20= | 3, 040 |
| (8)+152 · 800= | 121, 600 |
| (3)+152 ·3000= | 456, 000 |
| (1) | 581, 552 |
| 20 | |

B. SHORTENED SEQUENTIAL ADDITION WITH COMPLEMENTS

[14 revolutions]

| | |
|---|---|
| (4)−152· 4= | −608 |
| (3)+152· 30= | +4, 560 |
| (2)−152· 200= | −30, 400 |
| (4)+152· 4000= | +608, 000 |
| (1) | 581, 552 |
| 14 | |

SHORTENED SEQUENTIAL ADDITION WITH COMPLEMENTS AND TWO DISTRIBUTOR COUNTING-REGISTERS

[9 revolutions]

| Distributor counting-register I | | Distributor counting-register II | |
|---|---|---|---|
| (2)−152 · 4=−152 · 2= | −304 | −152 · 2= | −304 |
| (1)+152 · 10=+152 · 10= | +1, 520 | | |
| (1)+152 · 20=+152 · 10= | +1, 520 | +152 · 10= | +1, 520 |
| (1)−152 · 200=−152 · 100= | −15, 200 | −152 · 100= | −15, 200 |
| (2)+152 · 4000=+152 · 2000= | +304, 000 | +152 · 2000= | +304, 000 |
| Product sub-total | =(+291, 536) | Product subtotal | =(+290, 016) |
| (1) | +290, 016 ← | | 290, 016 |
| (1) | | | |
| (9) | 581, 552 | | |

With the *standard sequential addition* (Method A), by position shifting of the multiplicand in the pin control carriage, the machine performs a number of operations corresponding to the individual figures of the multiplier. In this case the required number of revolutions is identical with the sum of all digit values in the multiplier, i.e., 3+8+2+6+1 20 revolutions.

The first vertical column (the figures in parenthesis) indictaes the number of machine operations required with the individual product sub-totals.

With the *shortened sequential addition using the complements* (Method B) where multiplier sliders are used that are provided with descending and ascending scanning steps, the individual partial figures in excess of 5 are fed into the machine with their complements with respect to the next higher decimal value.

In this case, too, the arithmetical addition of the individual subproducts leads to the right result 581,552, with 14 revolutions of the machine.

In the case of the *shortened, sequential addition with complements and distributor counting-registers* (Method C), the complement method according to B is modified to the effect that the results of the individual submultiplications are not introduced into one single counting register as is the case with the methods A and B, but are distributed into two distributor counting registers and that the two product subtotals are then added to form the grand product total.

In the case of the submultiplication in the first decade −152·4, the value −152·2=304 is assigned to the distributor counting register I and the subproduct −152·2=304 is transmitted twice to the distributor counting register II with the subproduct, there being only two operations required. In the next decade, there occurs the submultiplications·30 in which the multiplication of $+152 \cdot 10 = 1{,}520$ is transmitted to the distributor counting register I. Subsequently, the same submultiplication +152.10 is simultaneously assigned to the distributor counting registers I and II so that, in the distributor counting register I, the sum 3,040 and in the distributor counting register II the sum 1,520 are introduced. In this case, too, two operations are required. In the third decade, the submultiplication·$200 = -152 \cdot 100 = 15{,}200$ is assigned simultaneously to the two distributor counting registers and, in the final decade, the submultiplication $4{,}000 = +152 \cdot 1000 = 152{,}000$ is simultaneously assigned to both distributor counting registers, with two machine rotations.

The sum 290,016 arithmetically added in the distributor counting register II is then, in a separate machine operation, added to the sum 291,536 with the addition operation occurring in the distributor counting register I thereby producing the correct result 581,552. Including grand product totalizing, method C requires 9 operations.

Therefore, the total number of operations required is the smallest with the method C in accordance with the invention.

With all methods, the required number of operations varies depending on given multiplier digits. For instance, given the multiplier 9999, the method A requires 36 revolutions whereas, with the other methods B and C, in each case two rotations are sufficient. The advantage of the method according to the invention with respect to the method B becomes more obvious when the multiplier digits consist of any of the values 2, 3, 4 and 8, 7, and 6.

For the purpose of sensing the mult-members, which operation occurs by digits starting from the unit position and advancing step by step up to the highest position of the multiplier, there are provided, in addition to a *main sensor* which determines the depth of the step in question with respect to the upper zero level of the steps, and hence the required number of machine operations:

A subtraction sensor which subtractively controls the actuated distributor counting registers once a mult-member is set to a multiplier digit higher than five.

An adjustment sensor capable of controlling, depending on the position of the next lower mult-member, a shifting of the main sensor, with respect to the sensed mult-members, to the next higher multiplier digit.

An engaging sensor which controls the differential engaging of the distributor-counting-registers into the control members.

If the main sensor faces an uneven multiplier digit, the engaging sensor is stopped by, respectively, the next lower or next higher even digit so that a difference in elevation of one step with respect to the main sensor and the engaging sensor is produced, by means of which the selection of the distributor-counter-register to be engaged at that machine cycle can be controlled.

On each side of the main sensor, in the longitudinal direction of the main sensor there is arranged one of the two sensor edges of the engaging sensor which are arranged in parallel relative to the longitudinal direction of the mult-members and are connected for the purpose of joint displacement movement, whereby the one sensor edge cooperates with the descending steps and the other sensor edge cooperates with the ascending steps of the mult-members.

The sensors are pivotally positioned on a laterally movable frame, hereinafter referred to as the *"multcarriage"* which is transversely movable by decimal places, whereby its sensors are adjusted one after another by means of the decimal-place-wise laterally unmovably arranged mult-members. In that operation, the mult-carriage is coupled with the pin position carriage so that, following sensing of the individual mult-members, there occurs a displacement by position of the multiplicand value put into the machine.

The control of the number of machine cycles to each multiplier digit is performed by a step-control member cooperating with the main sensor, which, upon sensing of the mult-member, is moved out of its initial position by a number of steps corresponding to the depth sensed by the main sensor, in order to be returned thereupon by the step-by-step actuation of each machine cycle into its initial position.

As is evident from the above comparisons, the multiplication performed with the least number of machine cycles is the one presently best known according to the method B and hence belonging to the state of the art and which is brought about by the fact that one uses for the multiplier respectively set mult-members to which, for each digit of the multiplier. one respective scanning step is assigned which indicates increasing step elevations from 0 to 5 and decreasing step elevations from 5 to 9 that are scanned by a main sensor. The latter is further equipped with a sensor member for subtracting shifting as well as for approximating so that, upon sensing of the multiplier digit, the main sensor will scan the number of decimal position for each step level.

The task of the approximating sensor is to determine in the next lowest decade whether, in the latter, the multiplier member has shifted beyond the multiplier 5 in order to feed in this case a numerical unit to the main sensor that is one digit higher. The task of the subtraction sensor is to determine in the decade position to be computed whether the mult-member has been shifted beyond the multiplier 5 in order to determine in this case the subtraction machine cycles. The last mentioned three sensor members therefore determine the number of cycles which should be executed by the machine as subtractions or additions with a given multiplier digit.

With each machine cycle, the main sensor is shifted back by one step level whereby, at the end of the last step retraction, a shifting of the sensor members and of the pin setting carriage by the next higher decade is actuated in which, as well as with all additional multiplier digits, the shifting is repeated. With the final step retraction in the last multiplier digit the main sensor actuates an automatic totalizing operation in which the product is printed on the paper tape and all multiplication members are returned into their inoperative initial position.

Since the sequences of the last-mentioned operations are generally customary and are therefore presumed to be known. the details according to the proposed invention, design and its explanations need not be provided in the operational description that follows since they may be considered as not belonging directly to the object of the invention.

It is therefore one object of the instant invention to provide a novel calculator for performing multiplications and the like.

Another object of the instant invention is to provide a calculator having novel means for performing multiplication using fewer operations than conventional calculators.

Another object of the instant invention is to provide a novel calculator comprising first and second distributor counters used in the performance of the multiplication operation.

Still another object of the instant invention is to provide a calculator for performing multiplication comprising first and second distributor registers; a longitudinally positionable mult-member for each digit of the multiplier and a mult-carriage for sensing the position of each mult-member to add or subtract integral values of the multiplicand into one or more of the distributor counters dependent upon the position of the mult-member being sensed.

Another object of the instant invention is to provide a novel calculator for performing multiplication comprising first and second distributer counters both being used to store quantities generated during the multiplication operation and further comprising means for generating the final product in the first one of said distributor counters, by transferring the quantity stored in the second one of said distributor counters to the first one of said distributor counters.

Still another object of the instant invention is to provide a novel calculator for performing multiplication wherein substractive, as well as additive operations are selectively performed during the multiplication to generate the final product using fewer operations than conventional calculators.

Figure 5:
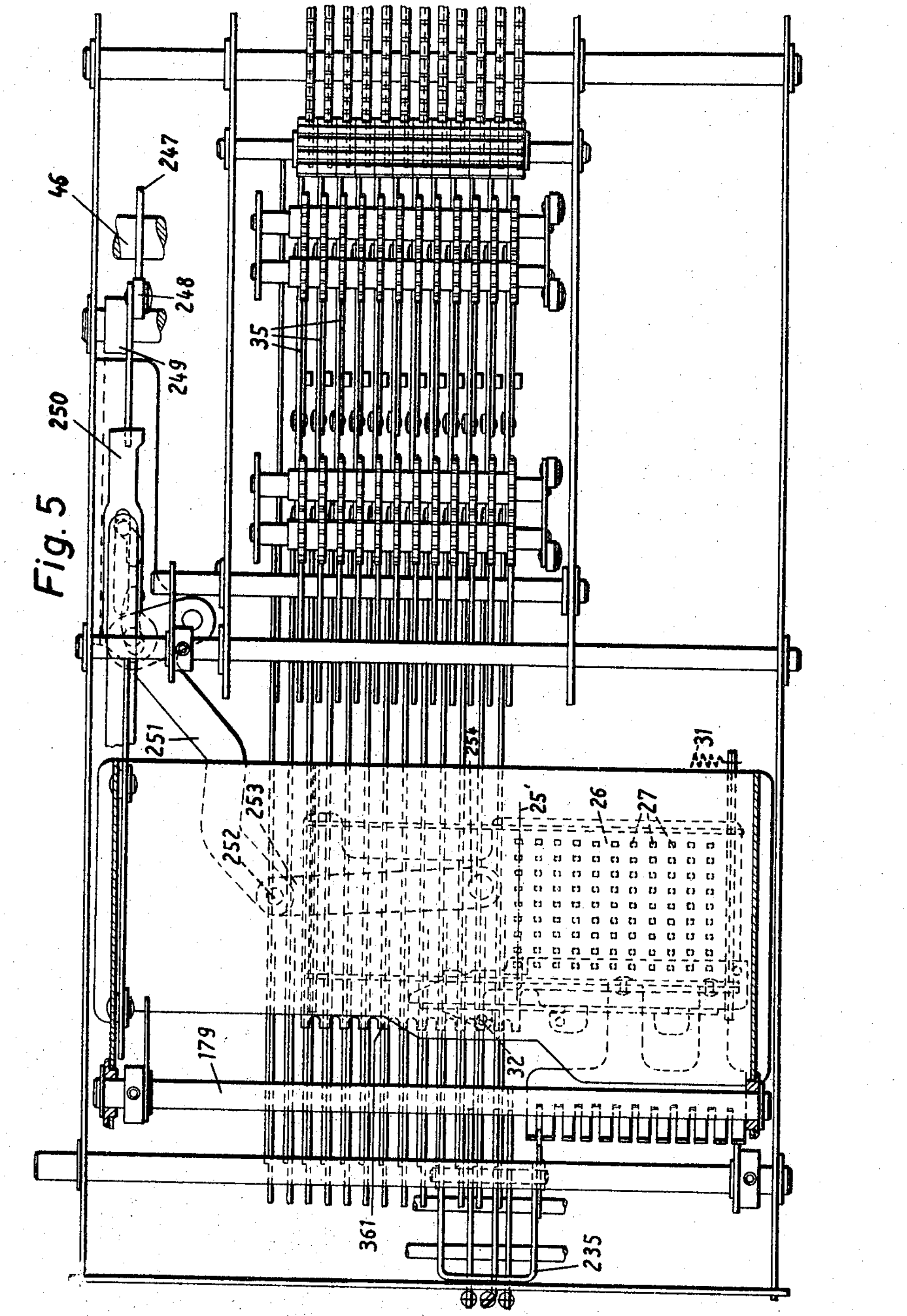

Still another object of the instant invention is to provide a novel calculator for performing multiplication wherein subtractive, as well as additive operations are selectively performed during the multiplication to generate the final product using fewer operations than conventional calculators, the selected operation being controlled by a multi-carriage assembly which senses the longitudinal position of a mult-member associated with each digit of the multiplier to add or subtract integral values of the multiplicand into one or both of the distributor counters. These as well as other objects of the instant invention will become apparent upon a consideration of the following description and drawings in which:

FIGURE 1 is a top plan view of the calculator for addition, subtraction and multiplication, according to the invention, FIGURE 2 is a vertical longitudinal cross-section through the machine with the printer omitted and showing the multiplier mechanism, FIGURE 3 is a vertical longitudinal cross-section through the machine showing the pin setting carriage, the drive mechanism and the two distributor counter registers, as well as the printer, FIGURE 4 is a side view of a mult-member, FIGURE 5 is a top view of the machine, with the housing removed, showing the respective position of the control members the pin setting carriage and the multiplier mechanism.

Figures 6, 7:
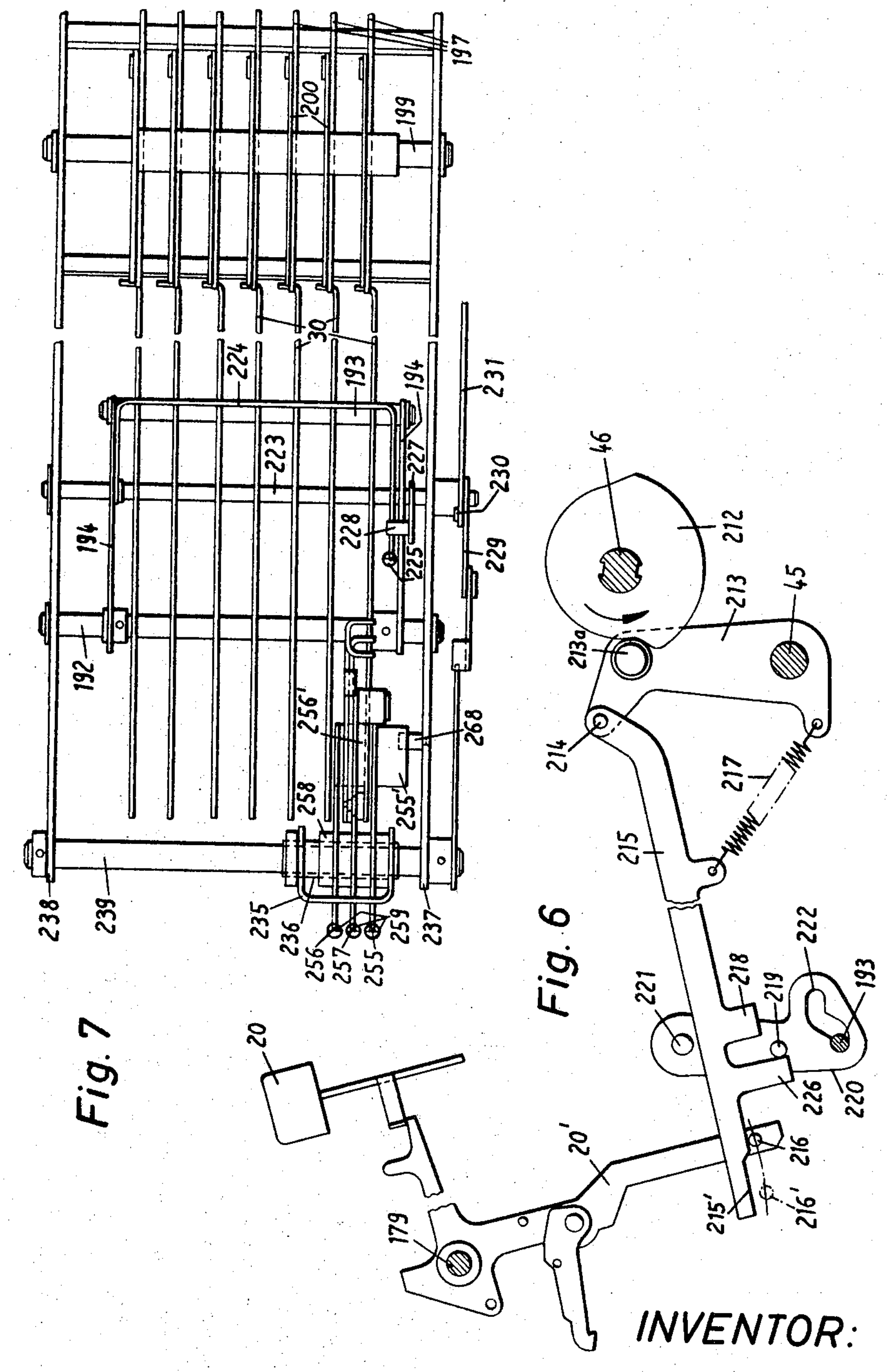
Figures 8, 9, 10:
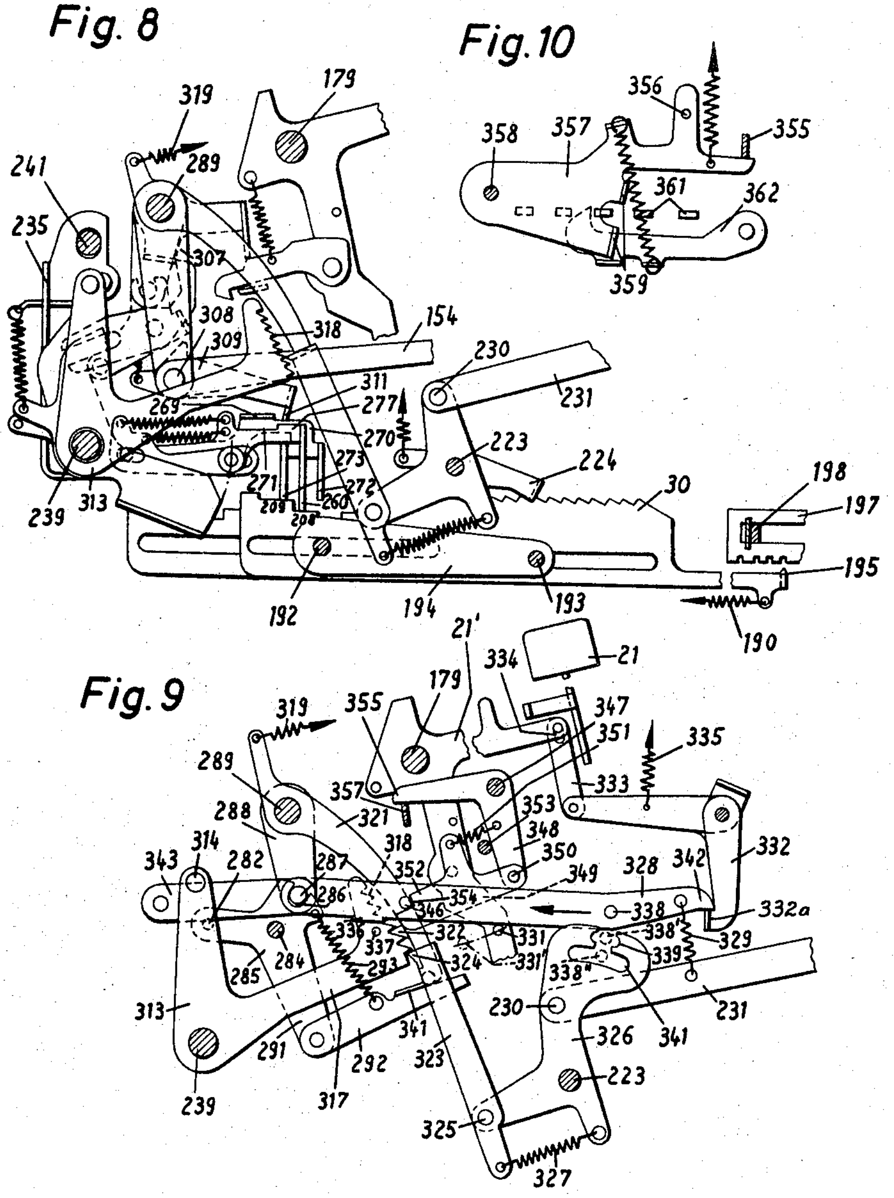
Figure 11B:
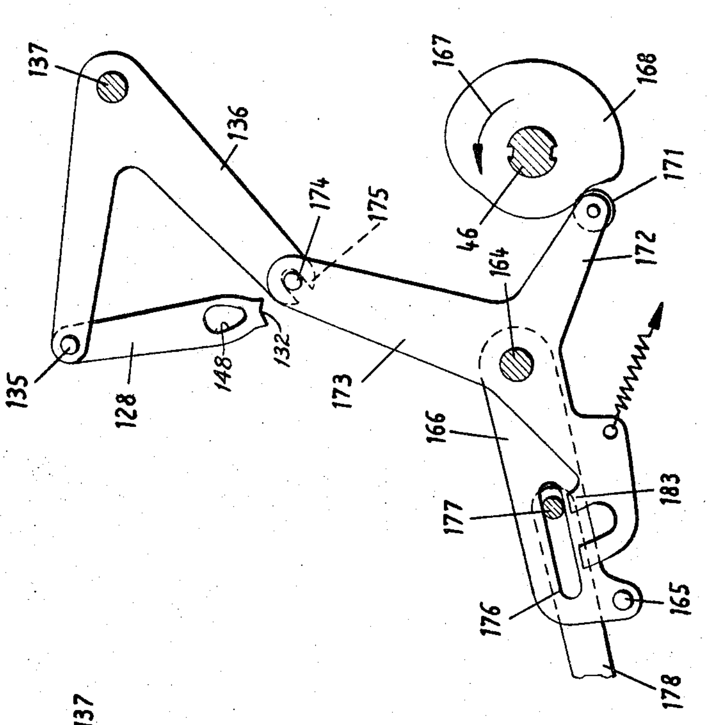
Figure 11A:
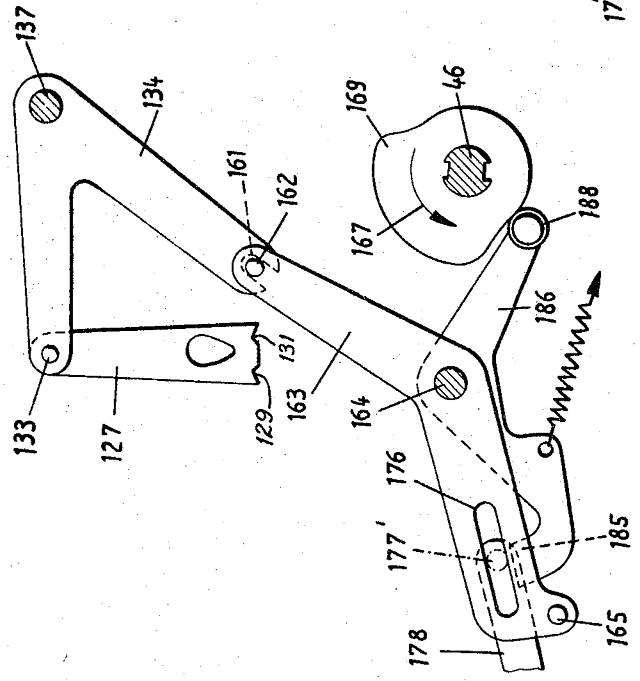
Figures 11, 12, 13:
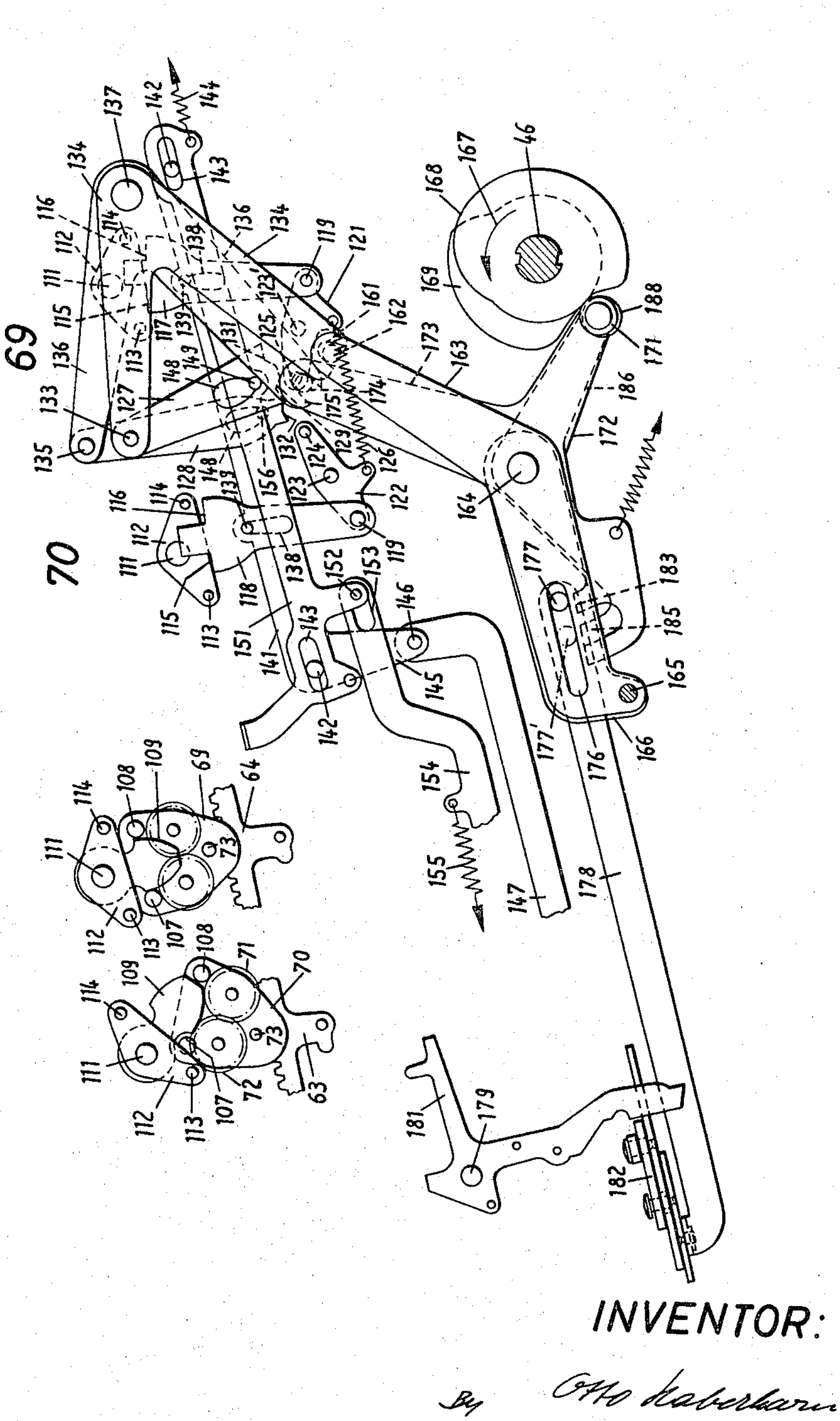
Figures 14, 15, 16:
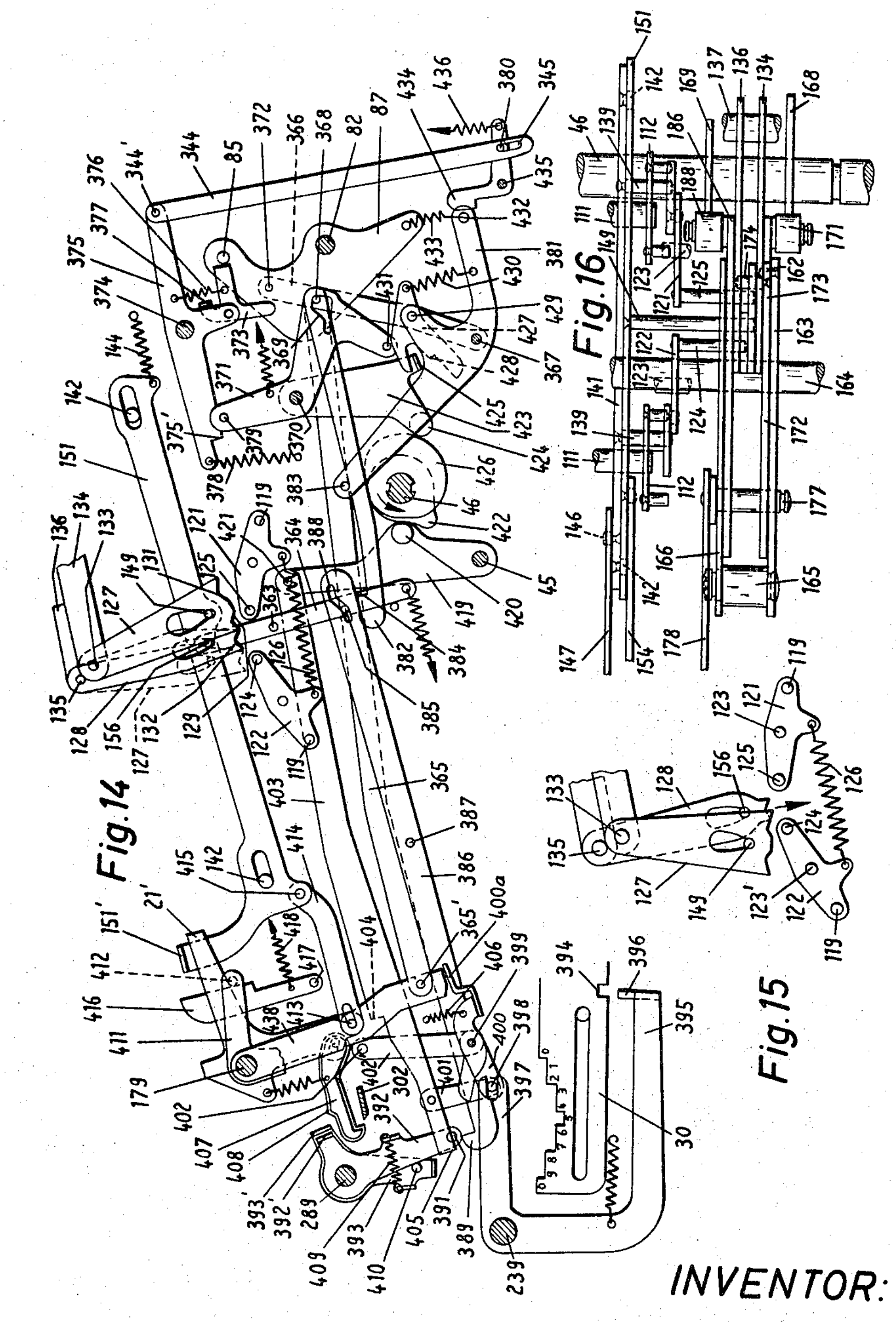
Figures 23, 24:
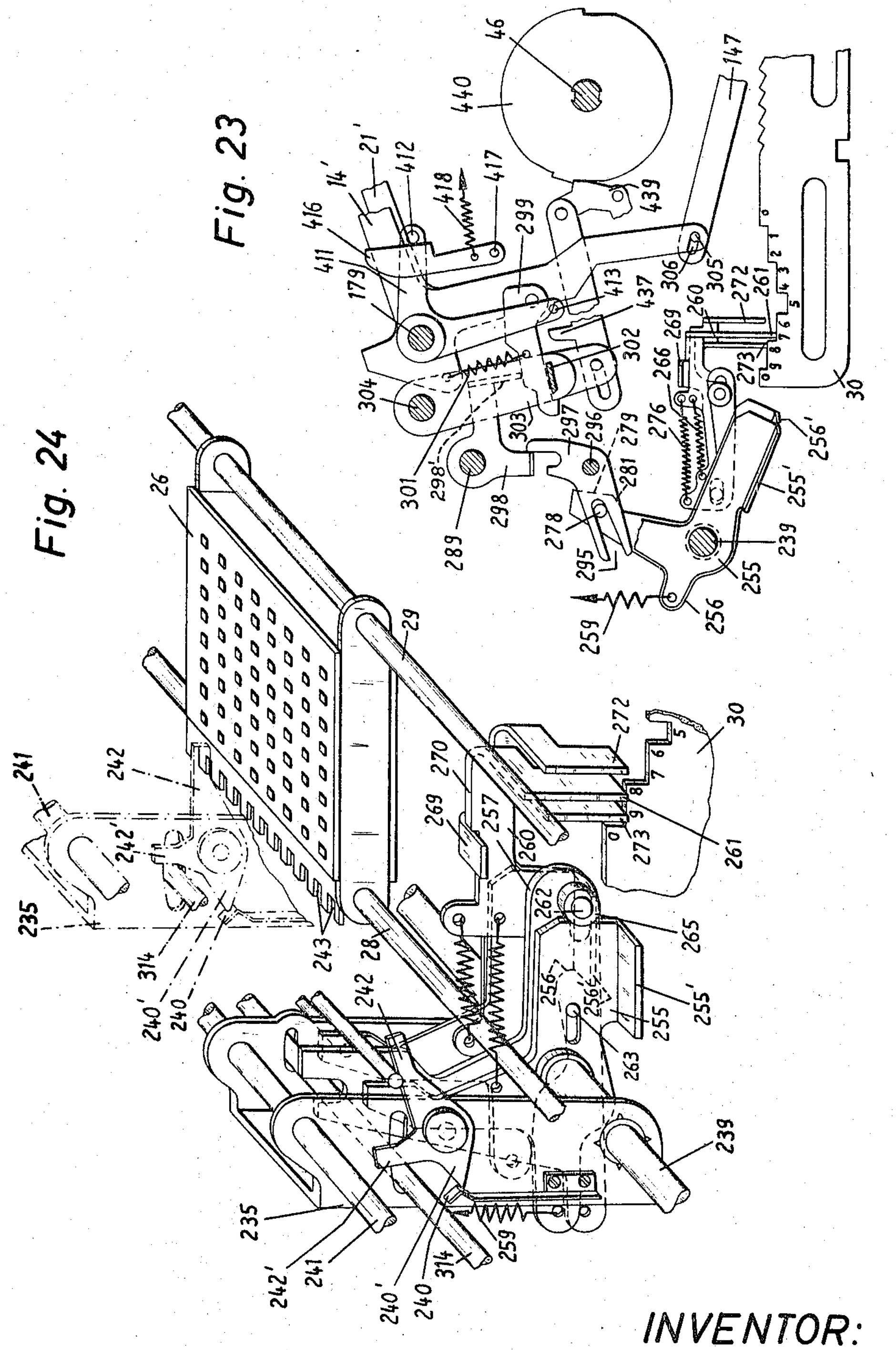

FIGURE 6 is a side view of some of the components controlled by the multiplier key, FIGURE 7 is a top view showing the multiplier mechanism, FIGURE 8 is a side view of the multiplier mechanism, FIGURE 9 is a side view showing functional components of the multiplier mechanism, FIGURE 10 is a detailed view of the shift lock for the pin setting carriage, FIGURE 11 is a lateral view of the counter control system, FIGURES 11*a* and 11*b* are detailed views of the counter control of FIGURE 11, FIGURES 12 and 13 are side views of the counters in various positions, FIGURE 14 is a side view of the counter control system, FIGURE 15 shows a portion of FIGURE 14 in greater detail, FIGURE 16 is a top view relating to FIGURE 11, FIGURE 17 is a diagrammatic representation in perspective of the sensing mechanism for the mult-members, FIGURES 18 to 22 are perspective views of details relating to FIGURE 17, FIGURE 23 is a partial view of the multiplier mechanism with connecting elements to the drive mechanism, FIGURE 24 is a diagrammatic representation in perspective of the multiplier mechanism in connection with the setting carriage.

*Machine controls (FIG. 1)*

The machine controls shown in the computer of FIGURE 1 consist of a set of ten keys 10 with the digit keys 1 to 9 and one zero key 11, a position indicator 12 for the indication of the key-in decimal position or for the respective position of the pin setting carriage, and function keys 13 to 21.

The function keys are an adding key 13 (+), a subtraction key 14 (−), the non-addition key 15 (#), the sub-total key 16 (◇), the grand total key 17 (*), the repeat key 18 (R), the correction key 19 (C), the multiplier key 20 (×) for the keying-in of the multiplier and he multiplicand key 21 (=) for the actuation of the multiplication.

By depressing one of the said functions keys 13 to 21 a machine cycle is actuated whereby, following depressing of the key 21 (=) the other operations required for the performance of a given multiplication will follow automatically, and the product will automatically be printed and the machine stopped. Depression of the correction key 19 (C) causes the cancellation of a number set into the machine by means of the key set 10, 11, and for the retracting of the pin seting carriage into its initial position.

A part of the paper tape 22 can be seen on the upper end of FIG. 1; at the lower end of the paper tape, type segments 23 can be noted whereas the counters are concealed by the housing. The following is an explanation of the general design of the calculator of the invention.

*Pin Setting carriage (FIGS. 3, 5)*

The digit keys 10 (FIG. 3) are arranged so as to be substantially vertically movable in the keyboard frame 24. Their lower ends 25 are arranged in one row 0 to 9 along the longitudinal direction of the machine, whose position is suggested in FIG. 5 by the dotted line 25'. Located beneath this row is a movable pin setting carriage 26 (FIG. 3) which supports a plurality of vertically displaceable setting pins 27 arranged in rows of decimal spacings (FIG. 5). In the initial position of the pin setting carriage 26 illustrated in FIG. 5, the row 25' of the key feet is situated above the setting pin row of the highest position in the setting pin carriage. The rows of the setting pins 27 are, upon keying-in of a number beginning with the highest digit of the number, set one after another under the key feet 25.

The pin setting carriage 26 (FIG. 3) is positioned on two stationary cross-bars 28, 29 and is moved step by step at right angles to the long side of the machine by a tension spring 31 and by means of a shift lock mechanism 32 (FIGS. 5, 10) under the effect of the tension spring 31 with each depression of a key 1 to 9 of the zero key 11. Upon depressing of a digit key 10 or of the zero key 11, the appropriate setting pin 27 (FIG. 3) is pushed out of the pin setting carriage 26 by the appropriate downwardly moved foot 25, as is noted by the setting pin 27', for example, shown in dotted fashion in FIG. 3.

*Control mechanism (FIGS. 3 and 5)*

The transversely arranged and frame-mounted rods 33 of square cross-section (FIG. 3) slidably support control members 35 which are longitudinally positioned in decimal spacings by means of slots 34 which receive rods 33 (FIG. 5). Rocking members 37 are hingedly connected by pins 36 (FIG. 3) to control members 35. Their projections 38 cooperate with the ends of the downwardly projected setting pins such as the pin 27' shown in FIG. 3. Tension springs 39 are connected to the front ends of the rocking members 37, which tension springs have their opposite ends connected to a frame-mounted holding plate 41 and which tend to pull the rocking members and the control members toward the rear (in FIG. 3, toward the right).

Counter to the effect of the tension springs 39, the control members 35 are maintained in their rest positions illustrated in FIG. 3 by means of a common transverse bar 42 (hereinafter referred to as a collective bar) which cooperates with the stop faces 43 of the control members 35. The collective bar 42, the arms 44 mounted at its ends and a frame-mounted shaft 45 to which the lower ends of the arms 44 are attached, a form rocking frame which is rocked by means of cam disks 47, 48 mounted on the main drive shaft 46, via rollers 51, 52 positioned on one of the arms 44 and on one arm 49. With each rotation of the main drive shaft 46 in counterclockwise direction (see arrow B), the collective bar 42 is swung during the first half turn of the shaft 46 out of the position 42 illustrated in FIG. 3 into the position 42' indicated in dotted lines and, during the second half turn of the drive shaft is swung back. The control members 35 are provided at their rear end (FIG. 3, right-hand end) with gear teeth which continuously engage the intermediate gear wheels 54 positioned on a stationary axis 55 placed in vertical partitions, which, in turn, cooperate with gear segments 56 of the type segments 57.

The control members 35 are provided with short longitudinal slots 58 and longer slots 59 in which, by means of pins 62 and 61, gear racks 63 and 64 are displaceably guided. Springs 65 bias the gear rocks 63 and 64 so that their bent elements 66 abut the stop faces of decimal shift levers 67 positioned on stationary axes 68 when the machine is in the rest position.

Each of the distributor counter registers 69 and 70, respectively, cooperates with the gear racks 63, 64, whose adding wheels 71 (71') or subtraction wheels 72 (72'), mating with one another, can selectively be turned around a stationary axis 73 (73') by turning of the distributor counter registers for engagement into the one or the other direction with the gear racks 63 and 64.

With the movement of the collective bar 42 toward the right (FIG. 3) the control members 35 follow under the control of their associated springs 39 until their projections 38 encounter an associated downwardly displaced setting pin (such as pin 27', for example) and are stopped, in which process they are moved by a number of shift units corresponding to the depressed digit keys. In the initial position of the pin setting carriage 26, a plurality of zero stops 74 mounted on the pin setting carriage 26 face the left side of each of the projections 38 next to the dotted lines 25' (FIG. 5). When one of the keys 1 to 9 is depressed, the corresponding zero stop 74 on the pin setting carriage 26 is displaced toward the left and out of the path of its associated related projection 38. No setting pin 27 is provided for the digit key 9, but rather a stationary "nines" stop bar 75 is provided which the projection 38 strikes when, upon depressing of the key 9, the respective zero stop 74 had been displaced. As the numbers are keyed step-by-step into the pin setting carriage 26 by means of the keys 1 to 11, the carriage with its pin rows 25 is moved step by step toward the left with respect to the rocker members 37 of the control members 35.

*Printer* (*FIGS. 3 and 5*)

If the amount is to be printed or is to be transmitted either additively or subtractively into one of the distributor counter registers 69, 70 then, following depressing of the function key 13 (+) or 14 (—) (FIG. 1), with the subsequent machine cycle, the collective bar 42 is, during the first semi-rotation of the main drive shaft 46, moved toward the right (FIG. 3) whereby the control members 35 following the collective bar, by means of their gearing 53, intermediate gear wheels 54, and tooth segments 56, set the type segments 47 to the amount keyed into the keyboard. Subsequently, a guide track 76 forming a pivotable frame together with the bearing shaft 77 and two arms 78, engages the gear wheels 54 which aligns the types 79 positioned to print a line on the paper roller 81.

The type segments 57 of each decimal digit position are pivotally positioned on the type wheel lever 83 rotating around a bearing rod 82 and are maintained in their rest position illustrated in FIG. 3, counter to the effect of tension springs 84, by means of a reset rod 85, and are furthermore locked by a substantially U-shaped clamp 86.

With the bearing arms 87 and the bearing rod 82, the reset rod 85 forms a rocker frame which, by means of a connecting link 88 and a pin 89 is connected to a roll lever 92 pivoting around a rod 91. The roll lever 92 cooperates by means of rollers 94, 93 with cam discs 95, 96 of the main drive shaft.

During the first half turn of the main drive shaft 46, the reset rod 85 is turned clockwise by the cam disks 95, 96 of the main drive shaft.

During the first half turn of the main drive shaft 46, the reset rod 85 is turned clockwise by the cam disks 95, 96 around the bearing shaft 82 whereby the tension springs 84 of the individual type wheel levers 83 of a rod 84' connected to one of the bearing arms 87 are further tensioned while the type wheel levers 83 are still blocked by the locking clamp 86. At the end of the first half turn, a conical detent 97 positioned on one of the bearing arms 87, reaches a projection 98 of the yoke 101 positioned on shaft 99 to lift the locking clamp 86 out of the locking notches 102 of the type wheel levers 83 causing the type wheel levers 83 to be released and, under the effect of the tensioned springs 84, to strike the set types 79 against the paper roller 81 and effect the imprinting of the amount keyed into the machine.

*Shifting and decimal shifting* (*FIGS. 3 and 5*)

At the beginning of the striking of the type wheel levers 83, locking pawls 103 positioned at the upper end engage the tooth segments 56 so that the tooth segments 56, while being disengaged from the gears 54, have their setting positions secured through engagement with locking pawls 103. Subseqently, the distributor counter register or registers 69, 70 into or from which the printed amount is to be added or subtracted, engage the gear racks 63 and/or 64 with their adding wheels 71 or their subtracting wheels 72.

Due to the return movement during the second half turn of the collective bar 42 into its initial position shown in FIG. 3, the control members 35 are moved back by the keyed in amount so that the latter is additively or subtractively transferred to the engaged distributor counters 69, 70.

If, during the addition or subtraction there occurs a passage of the gear wheels 71 or 72 from 9 to 0 or from 0 to 9, the decimal teeth 104 mounted at the addition and subtraction wheels press back the decimal counter lugs 105 (105') cooperating with them. The latter are fitted on decimal counter levers 106 ordinarily locking the aforementioned decimal control levers 67 in the position shown in FIG. 3. The lower ends of the decimal control levers 67 cooperate with flanges 66 of the gear racks 63, 64, namely with the next higher places in such a way that the gear racks 63 and 64, respectively, are ordinarily blocked in the position shown and cannot be moved any further under the effect of the springs 65. However, should there occur a transition in the related gears 71, 72, the decimal control lever 67 is released so that the gear rack 63, 64 is able to make a further movement by one shift unit toward the left under the effect of the spring 65 in order to execute the decimal shifting.

*Counter engaging and disengaging mechanism*
(*FIGS. 11–16*)

In order to perform the shortened, sequential multiplication with complements and distributor counter registers, these registers must be engaged with and disengaged from the control members independently of one another during the various machines cycles, and must also be adjustable to perform addition or subtraction and totalizing.

The said frames of the distributor counter registers 69, 70 that rotate around the stationary pins 73 (FIGS. 12, 13) are provided at their upper ends with projecting pins 107, 108 that cooperate with cams 109 mounted onto crosspieces 112 resting on stationary bolts 111. The said crosspieces are provided with projecting pins 113, 114 that cooperate with the bearing surfaces 115 and 116, respectively, (FIGS. 11, 15, 14) of driver rods 117 and 118. Pins 119 link the driver rods 117 and 118 to rocker arms 121 and 122, respectively, which arms 121 and 122 rock around the stationary pins 123, 123', and are provided with lugs 124, 125. The two rocker arms 121, 122 are urged in opposing directions by a spring 126 connecting them. The lugs 124, 125 (FIGS. 11, 15, 14) cooperate with a swivel arm 127 namely by means of a recess 129, 131 arranged at the lower end of the latter in order to connect either only the distributor counter register 69 alone or simultaneously connect both the distributor counter registers 69 and 70. The lug 124 cooperates furthermore with a swivel arm 128, namely by means of the notch 132 provided at its lower end, in order to engage only the distributor counter register 70. The swivel arm 127 (see FIG. 11*a*) is pivotally connected to an angle lever 134 by means of a pin 133 and the swivel arm 128 (see FIG. 11*b*) is pivotally connected to an angle lever 136 by means of a pin 135. The two angle levers 134, 136 rest side by side on a bearing rod 137 (see also FIG. 16). The recesses 138 (FIG. 11) of the addition-subtraction driver rods 117 and 118 engage the pins 139 of a control track 141 for the addition-and-subtraction switching which is displaceably positioned by means of slots 143 on stationary pins 142, counter to the effect of a spring 144. Pin 146 pivotally connects a downwardly directed arm 145 of the control track 141 to a connecting link 147 leading to the subtraction key lever 14' (see FIG. 23) at the front end of the machine and transmitting, in a manner still to be described below, the setting of the distributor counter registers 69, 70 to addition or subtraction.

If the addition and subtraction driver rods 117, 118 are moved by the control track 141, connected thereto by means of the pins 139, into the position swung to the right illustrated in FIG. 11, they are set for addition so that they will, when moved upwardly catch the pins 114 with their bearing surfaces 116, and deflect the crosspieces 112 in counter-clockwise direction (FIG. 13) and bring the distributor counter registers into the position illustrated in FIG. 13 in which their adding wheels 71 (FIGS. 12, 13) engage the gear racks 63, 64. If the driver rods 117, 118 are in the swung-out position to the left, the subtraction wheels 72 become engaged with the gear racks 63, 64.

The swinging position of the two swivel arms 127, 128 defines whether and which one of the two distributor counter registers 69 and 70 will engage the gear racks 63, 64. A pin 149 engages in a recess 148 of the swivel arm 127, which pin is mounted on a control track 151 for the engaging of the distributor counter registers that is likewise longitudinally displaceable on the stationary pin 142 and is likewise spring-loaded toward the right by spring 144. By means of the pin 152, the track 151 engages a slot 153 of a connecting rod 154 which is spring-loaded toward the left by a spring 155 and moves toward the multiplication mechanism.

If the swivel arm 127 is moved downward in the position illustrated in FIG. 11, its recess 129 encounters the pin 125 of the rocker arm 121 and moves the latter counter-clockwise so that the driver arm 117 is moved upward and the distributor counter register 69 (FIG. 12) is engaged into the gear racks 63 in the manner described above.

The swivel arm 127 can be moved to the left by the track 151 in such a way that its recess 129*a* will be positioned above the pin 124 and its recess 131 above the pin 125 so that, with its downward motion, both distributor counter registers 69 and 70, respectively, will be engaged with their gear racks 63 or 64, respectively (see also FIGS. 11 and 14).

The swivel arm 128 (FIG. 11) is further provided with an opening 148. A pin 156 of the rod 364, positioned on the stationary pin 365 (FIG. 14), engages recess 148, said pin holding the swivel member 128 normally in the center position illustrated in FIG. 11 in which it can be moved during its either upward or downward movement between the two rocker arms 121, 122 without imparting any movement to these rocker arms.

During only in the final machine cycle of a multi-operation explained in further detail below, the swivel arm 128 is set via the pin 124 of the rocker arm 122 in order to transfer the amount taken out of the distributor counter register 69 into the counter 70.

The above-mentioned angle lever 134 carrying the rocker arm 127 (FIG. 11) is provided with a fork 161 which is coupled to an angle lever 163 through pin 162. Angle lever 163 pivots on a bearing rod 164 and is rigidly connected to an arm 166 at its left end by a bolt 165.

Main drive shaft 46 rotates in the direction of the arrow 167 with each operation and is provided with a cam disk 168 for addition (FIG. 11*b*) and a cam disk 169 for the sum total (FIG. 11*a*). The addition cam disk 168 cooperates with the roller 171 of a three-arm lever 172 which is rotatably mounted upon the bearing shaft 164. Its upwardly extending arm 173 is provided with a lug 174 engaged by a fork opening 175 of the above-mentioned angle lever 136 to which the rocker arm 128 is pivotally connected so that with each machine rotation, the rocker arm 128 is given an upward and downward movement, independent of the position of the coupling bolt 177 (to be more fully described). Since both arms 163, 173 perform an addition movement in the position of the coupling bolt 177 (FIG. 11), although the arm 173 is initially moved via roller 171 directly from the cam 168, if the coupling bolt 177 is set into the position 177' shown in dotted lines in FIG. 11*a*, 11*b* the lever 173 receives its control motion directly from the cam disk 168 and the lever 163 from the cam disk 169 via the roller 188 of lever 186, the coupling bolt 177 and the pivoting unit 163, 166.

The angle lever 163 and the arm 166 rigidly connected thereto are provided with coinciding slots 176 in which a coupling bolt 177 is displaceable and which is mounted upon a setting rod 178 joined to one of the intermediate members 182. By means of the latter, the setting rail 178 can be contacted with one of the function key levers, e.g. a key lever 181 jointly situated on a key bearing rod 179, and be brought into different longitudinal positions assigned to the corresponding functions. Cooperating with the coupling bolt 177 in its position indicated in FIGURE 11 is a projection 183 of the three-arm lever 172. Upwardly directed arm 173 is under the influence of the cam 168 and, at the beginning of the second half of the machine cycle, is moved clockwise and, at the end of the second half of the machine cycle, is moved counter-clockwise whereby the sub-counter 70 is engaged via the pin 174, the angle lever 136 and the rocker arm 128 when the latter is in the position illustrated in FIGS. 11*b*, 14, the distributor counter register 70 is engaged at the beginning of the second half of the machine cycle into its gear racks 64 and disengaged at the second half of the machine cycle.

If the coupling bolt 177 (FIG. 11) is set in the dotted line position 177' by means of a projection 185 of the roll lever 186, the pivoting unit 163, 166 is moved, via the coupling bolt 177 such that the totalizing cam disk 169 slidingly engages the roller 188 of the roller lever 186, whereby clockwise movement at the beginning of the first half of the machine cycle and counter-clockwise movement at the end of the first half of the machine cycle is transmitted via the pin 162, to the angle lever 134 which is first pivoted counter-clockwise and then clockwise and, depending on its rocking position, the rocker arm 127 engages either the distributor counter register 69 or both distributor counter registers 69 and 70 (FIGS. 11*a*, 14).

*Arrangement of the mult-members*

A mult-member or mult-slider 30 is assigned to each control member 35 (FIGS. 2, 4). The mult-members are arranged to be displaceable in the lengthwise direction in the front part of the machine beneath the setting and control mechanism by means of longitudinal slots 189, 191 (FIG. 2) on a frame-mounted shaft 192 and a pivoting link 193 corresponding to the position spacings (FIG. 7) of the control members. The mult-members are set by the control members according to the digits of the multiplier introduced in the digit positions 0 to 9 (see FIG. 2). The mult-member 30 shown in FIG. 2 is set to the numerical value 0. The pivoting rod 193, together with the arms 194 mounted onto the ends of the shaft 192, forms a rigid pivoting frame that can be rocked up and down by the raising and lowering of pivoting rod 193.

The mult-members 30 are biased by springs 190 which tend to pull them into their left-hand terminal position, i.e. the zero position, where the right-hand ends of their slots 189 or 191, respectively, bear against the shaft 192 or the pivoting rod 193, respectively.

At the right end of the mult-members 30, flanged noses 195 are provided which cooperate with slots 196 at the lower side of intermediate pushers 197 that are longitudinally displaceable on square rods 198, 198'. The intermediate pushers 197 are mechanically connected with their corresponding control members 35 via levers 200 pivotally positioned on a frame-mounted rod 199, which levers engage pins 202 and 203 with their forked ends 201, 201', respectively.

In order to bring the mult-members 30 (see FIG. 4) into their longitudinally displaced position corresponding to the multiplier, each of the mult-members is provided with spaced gearing 204 along its upper edge. They have at the other end six steps 205 to 210 of identical step elevation, namely, the descending series of steps 205, 206, 207 and the ascending series of steps 208 to 210.

Two multiplier digit positions each are assigned to each one of the steps 205 to 209, with the exception of the step 207, namely:

| Steps: | The positions for the numerical values |
|---|---|
| 205 | 1 and 2 |
| 206 | 3 and 4 |
| 208 | 6 and 7 |
| 209 | 8 and 9 |

However, only one numerical position is assigned to the step 207, namely the one for the numerical value 5.

The sensing depth of the various steps, measured from the upper edge 211 of the multiplier members 30, which is on the same level as the step 210, corresponds to the number of the machine cycles to be performed for the multiplier digit in question.

*Multiplication operation*

Following the entry of the multiplier by selectively depressing the digit keys 10 and the zero key 11, whereby the pin setting carriage 26 is moved toward the left by a number of steps corresponding to the number of multiplier digits (FIGS. 1, 2, 3), the multiplier key 20 (×) is depressed thereby actuating a machine cycle during which the mult-members 30 are adjusted to conform to the digits of the multiplier. The two distributor counter registers 69, 70 remain disconnected. However, the multiplier is imprinted on the paper tape 22 following the completion of the first half revolution of the main shaft 46.

Mounted on the drive shaft 46 (FIG. 6) is a cam disk 212 which, via a roll lever 213 resting on a bearing shaft 45, reciprocates rod 215 once through sliding engagement between roller 213a and cam 212. Rod 215 is pivotally connected to said roll levers by means of a pin 214 and is reciprocated during the machine cycle actuated by the multiplier key 20.

When key 20 is depressed, it rotates the key-lever 20', which is positioned on the key bearing rod 179, in the clockwise direction thereby moving a pin 216 cooperating with the rod 215 into the position 216', causing link 215, as a result of a spring 217 tensioned between the roller lever 213 and the link 215, to swing downward so that the end 215', having a reduced width, bears against the pin 216 in the position 216'. In that process, a finger 218 integral with the said rod enters the area of a pin 219 of arm 220 pivotally positioned on a stationary pin 221 and comprising the above-mentioned rocking rod 193 with a cam slot 222. After the control members 35 (FIG. 2) are set during the first half of the machine cycle to the entered multiplier digits by movement toward the right, moving the intermediate pushers 197 by the same amounts toward the left, the cam disk 212 (FIG. 6) through its sliding engagement with roller 213, moves rod 215 toward the left whereby the pin 219 is caught by the finger 218, causing the lever 220 to be turned clockwise and hence the rocker rod 193, constituting a part of the frame 192, 193, 194 which holds the multi-members 30 at their right extremities (FIG. 2), is moved upward by means of cam slot 222 (FIG. 6) and the noses 195 (FIG. 2) to engage the recesses 196 arranged facing them on the intermediate slide bar. During the second half of the machine cycle, the control members 35 are returned into their initial position toward the left (FIG. 2), causing the multi-members 30 to be engaged by the dogs 195 and set in the shift positions corresponding to the multiplier figures.

In these positions, the multi-members 30 are jointly locked in the set multiplier digits by means of a locking yoke 224 (see also FIG. 7) cooperating with the spaced gearing 204, which locking yoke is influenced by a spring 225 (FIG. 2). They retain their position even during the subsequent sensing operations performed in special machine cycles by the sensors until, following completion of the sensing, they are released by the lifting of the locking yoke 224 and return to their terminal position on the left-hand side, as shown in FIG. 2, under the effect of their springs 190.

In the second half of the machine cycle, following imprinting of the multiplier on the paper strip 22 (FIG. 1) and the setting of the multi-members 30, the rod 215 (FIG. 6) is again moved toward the right by the cam disc 212 (FIG. 6) whereby the lever 220 returns via the pin 219 which is pushed toward the right by a second finger 226 integral with the rod 215 to move rod 215 into its terminal position toward the right illustrated in FIG. 6, thereby lowering the rocking rod 193 by means of the cam slot 222 so that the noses 195 (FIG. 2) are again disengaged from the intermediate sliders 197.

The bearing rod 223 (FIG. 2) is pivotally positioned between the partitions 237, 238 (see also FIG. 7), which also has mounted thereon an arm 227 which with an arm of locking yoke 224 cooperates by means of a pin 228, with said arm being actuated by the spring 225.

A three-arm lever 229 is also pivotally mounted upon bearing rod 223 and has an upwardly turned arm which is pivotally connected by means of pin 230, rod 231 and pin 232 (FIG. 2), to a roll lever 233 resting on the bearing shaft 45, said roller lever cooperating with a cam 234 of the main drive shaft 46.

By means of cam 234, the locking yoke 224 is either released for engagement with the locking gearing 204 via the rod 231 and the pin 228 under the effect of the spring 225 in order to block the multi-members 30 in their set positions or it is lifted, counter to the force of spring 225, by means of the pin 228, out of engagement with the locking gearing 204.

Following sensing of the multi-members 30 in a manner to be described below, by the above mentioned sensors, the came disk 234, via the rod 231, the three-arm lever 229 and the pin 228 brings about the lifting of the locking yoke 224 out of the locking gearing 204 so that the multi-members 30, after they have their noses 195 disengaged from the recesses 196, can return to their initial positions indicated in FIG. 2, under the effect of their springs 190.

*General execution of the multiplication*

Following completion of the multiplier machine cycle, the multiplicand is entered by means of the keys 10 and 11 whereby the pin setting carriage 26 is moved again by means of the shift lock mechanism 32 (FIG. 5) by a number of steps corresponding to the number of multiplicand positions, toward the left side of the machine.

By depressing of the multiplicand key 21(=), a sequence of automatically following machine cycles is then actuated whereby the following events occur:

During the first machine cycle of the series, the multiplicand fed into the pin setting carriage 26 is absorbed by the control members 35 and, following completion of the first half of the machine rotation, is imprinted. Following this imprint, the print mechanism is set for the subsequent machine cycles and is not operative again until the imprinting of the final product.

The multiplicand value remains in the pin setting carriage and the pin setting carriage remains in the displacement position it has reached. Following the first machine cycle there follow several series of operations. During each series, the mult-carriage is set to the next higher mult-member and, simultaneously, the pin setting carriage is moved by one digit spacing toward the left side of the machine. The mult-member arranged in the area of the sensor is sensed and there occurs subsequently a number of machine cycles corresponding in number to the sensing depth of the main sensor. During each machine cycle the multiplicand is transmitted to one or two distributor counters corresponding to the respective decimal position.

The mult-carriage 235 (FIG. 2) on which rest the initially indicated sensors for the sensing of the mult-members 30, remains in the rest position of the machine in its right hand initial position (FIG. 7) in the area of the mult-member 30 of the unit place of the multiplier and, following movement of the pin setting carriage 26 upon feeding in of the multiplicands; is coupled with the pin setting carriage for joint step-wise movement.

At the beginning of each initial machine cycle of each series, the sensors are moved downward in a definite sequence onto the mult-member 30 whereby a step shift lever 317 (FIG. 9) controlled by the sensor edge of the main sensors is displaced by zero to up to three angular spaces in order to control the actuation of a number of machine cycles corresponding to the multiplier number in question. With each machine operation, the step shift 317 is rotated back into its initial position by one angular step each and, during each machine cycle, the multiplicand is transmitted to one or to both of the distributor counter registers.

During the final angular step of the step shift lever 317 towards its initial position an action is brought about that, through the aforementioned shift lock mechanism 32 (FIG. 5), under the effect of the spring 31, the mult-carriage is moved into the area of the subsequent mult-member of the next decimal place and, at that point, the corresponding processes for the sensing of the machine cycle control, as well as for the transferring of the multiplicand, are brought about and so on, until, the last connected mult-member is reached and the step shift member has again reached its initial position and the pin setting carriage in addition to the mult-carriage is returned by a per se known retracting device comprised of components 247 through 254 (FIG. 5).

This is followed by an additional machine cycle in which the amount arithmetically added in one of the distributor counter registers is added to the other distributor counting register and the completed end product is printed. During the machine cycles performed after completion of the sensing operation, the above-mentioned per se known, and therefore not further described lifting device for the return of the setting pin carriage 26 (FIG. 5) under tension of the spring 31 via the chain of elements 247/254 is not actuated, due to the rod 250 being removed by key 21 (FIG. 1) from the angular reach of a roller lever 249 having a roller 248 cooperating with a cam disk 247. The devices used to this effect and their operations are described below in further detail.

*Mult-carriage*

The above mentioned sensors whose function was briefly described and that are intended for the sensing of the mult-members 30 and for causing certain machine operations, are laterally guided in the mult-carriage 235 (FIGS. 7 and 17) which has a U-shaped cross-section and is displaceably arranged from decimal place to decimal place by means of a sleeve 236 (FIG. 7) on a shaft 239 rotatably journalled in the frame walls 237 and 238, as well as on one guide rod 241 (FIG. 17) arranged above said shaft in the frame walls.

The mult-carriage assembly 235 is provided with a pivotable coupling finger 242 (FIG. 24) which cooperates with notches 243 mounted in decade spacings on the pin setting carriage 26 and connecting it with the pin setting carriage 26 for joint step movement toward the left hand side of the machine. In the rest position of the machine, the coupling finger 242 is resiliently held by means of a leaf-type spring 240 in its inoperative position, shown in solid lines in FIG. 24, which spring 240 acts on a locking arm 240′ of the coupling finger.

With the displacement in the clockwise direction of the rod 314 described below in further detail, at the start of the sensing of the mult-members 30, said rod strikes an arm 242′ of the upwardly directed coupling finger and brings the latter in contact with the notch 243 set to receive it in the position, indicated in dotted lines, in which it is held by a spring until, with the return of the mult-carriage 235 to the right side of the machine it is pressed back into its inoperative position by a stationary slanted surface (not shown) which is arranged in the track of the adjustable locking arm 240′.

*Arrangement of the sensors*

On the sleeve 236 (FIG. 7), within the mult-carriage 235 assembly there are arranged the shift sensor 255 (FIG. 22), the subtraction sensor 256 (FIG. 18), and, therebetween, a carrier lever 257 (FIG. 21) in the form of levers which have their hubs 258 arranged to be freely pivotable on the sleeve 236 (shown in exploded fashion). Each one of these three levers is under the effect of a corresponding spring 259 (FIG. 17) tending to turn all of these levers clockwise.

The shifting lever 255 (FIG. 22) senses, by means of flange 255′, the respectively next lower mult-member 30. On the other hand, the carrier lever 257 (FIG. 21) does not sense the mult-members themselves but is only a carrier of the main sensor 260 (FIG. 20) of the engaging in sensor 260.

With regard to the cooperation of the sensors with the mult-members, consider FIGS. 2, 7, 8, 23 and 24.

The main sensor 260 (FIGS. 17 and 20) by means of an edge 261 positioned at right angles with respect to the mult-members 30, scan each mult-member 30 in accordance with the displacement position of the mult-carriage 235. The sensor is positioned adjacent the carrier lever 257 (FIG. 21). To this end, riveted pins 262 and 263 engage lever 257 in slot 264. Pin 262 projecting from slot 264′ having roller 265 also engages an opening 261 in sensor 260.

A spring 266 tensioned between carrier lever 257 and main sensor 260 (and shown in broken fashion in FIGS. 20 and 21) tend to pull the main sensor 260 by one multiplier digit spacing toward the left (FIG. 17). However, ordinarily, one of them is prevented from doing so by the fact that the roller 265, as can be seen from FIG. 17, bears against a vertical edge 267 of the shift sensor 255.

However, if the shift sensor 255 (FIG. 22) is moved downward in the clockwise direction, the roller 265, under the effect of the spring 266, is moved toward the left, together with the main sensor 260, by one multiplier digit unit. This occurs, however, only if the mult-member 30 of the next lower place has been set to a decimal figure larger than "5." In that case, the flange 255' can then turn downward past the mult-member 30 of the next lower place (see FIG. 23) and the sensing edge 261 of the main sensor 260 moves prior to the scanning of the mult-member 30, to which the mult-carriage has been set, depending on the digit on which the mult-member 30 is positioned, with respect to its stepped digit places 0 to 0 (FIG. 4), from 0 to 1, 1 to 2, 2 to 3, 4 to 5, 5 to 6, 7 to 8, or 9 to 0 (see also FIG. 24). During the movement of the edge 261 from 0 to 1, 2 to 3, 4 to 5, the scanning depth of the sensing edge 261 is increased by one unit each. Upon the shifting from 5 to 6, 7 to 8, and 9 to 0, it is reduced by one unit.

As long as the flange 255' of the shift sensor 255 is situated in the area of the step 210 (FIG. 2) of the mult-member 30 of the next lower place, it is retained by the latter in its sensing movement so that a release of the roller 265 as well as a shifting of the main sensor 260 into a position increased by one digit unit does not occur. During the sensing of the mult-member 30 of the first decade, the flange 255' cooperates with a pin 268 (FIG. 7) mounted in the frame wall 237 and prevents the displacement of the main sensor 260 by one unit to the left (FIG. 2).

The engaging sensor 270 (FIG. 19), referred to previously and controlling the engaging of the distributor counter registers, is pivotally mounted upon pin 263 (FIGS. 17 and 20) riveted in the main sensor 260. A laterally extending flange 269 of sensor 270 cooperates with a recess 271 of the main sensor 260. Its lower end is provided with a pair of sensing edges 272, 273 arranged at either side of the sensing edge 261 of the main sensor in digit spacing. Although the engaging sensor 270 moves together with the main sensor 260, it can, however, move also with respect to the main sensor 260 and the carrier lever 257 about its pivot pin 263. A spring 276 is mounted between a hole 274 of the main sensor 260 (FIGS. 17, 19, 20) and a hole 275 of the engaging sensor 270, which spring is tensioned to normally engage the flange 269 within the recess 271, namely in such a way that the edge 277 of the main sensor 260 is substantially coplanar with the upper surface of the flange 269 (see FIG. 17). The subtraction sensor 256 (FIG. 18) contained in the mult-carriage 235 on the sleeve 236 (FIG. 7) and normally biased to move clockwise about shaft 239 by its spring 259 is provided at its lower end with a flange 256' with which it scans the mult-member 30 at which the mult-carriage is set. The subtraction sensor 256 is likewise prevented from a downward shifting during sensing, if the mult-member 30 is set to a figure not exceeding "5."

In the case of a setting exceeding "5" it is released by the step 210 and turned clockwise by its spring 259 whereby a rod 278 (FIGS. 17, 23) secured to its upper arm sets the distributor counter registers 69, 70 (FIG. 11) to be engaged (FIG. 1) to subtraction.

From the above it is obvious that the main sensor 260 with its sensing edge 261, the engaging sensor 270 with its sensing edges 272, 273 and the subtraction sensor 256 with its deflection 256' scan the mult-member 30 onto which the mult-carriage has been set during its transverse movement whereas only the shift sensor 255 with its flange 255' scans the mult-member 30 of the next lower place.

*Shifting of the main sensor*

The shift sensor 255 and the subtraction sensor 256 are each provided with a stop surface 279, 279' at their upper ends (FIGS. 17, 18, 22). A notch 281, 281' is positioned immediately beneath the respective stop surfaces 279, 279'. A rod 282 (FIG. 17) pivotally mounted on an arm 283 of a three-arm lever 285 (see also FIG. 9) normally bears against the stop surfaces 279, 279'. The lever 283 has a forked portion 286 which grasps a pin 287 of an arm 288 having its upper end resting on a frame-mounted shaft 289 (FIGS. 8, 9). The three-arm lever 285 has its downwardly pointing arm 291 hingedly connected to a pawl 292, which is joined with the fork 286 by means of a spring 293.

When the rod 282 is moved downwardly at the beginning of each sensing machine cycle in counter-clockwise direction (FIG. 9), it slides off the stop surfaces 279, 279' (FIG. 17) and reaches the notches 281, 281' thereby releasing first the two sensors 255 and 256 and permitting them to perform their scanning motion, provided that the mult-members cooperating with them are set into a digit position higher than "5." If this is the case, the shift sensor 255 releases the roller 265 so that the main sensor 260, together with the engaging sensor 270, can move by one numerical unit to the left (FIG. 17).

At that moment, the carrier lever 257 is still prevented from clockwise movement by its stop face 294, at its upper end, which stop face likewise cooperates with the rod 282, but extends further downward than the stop faces 279, 279' (FIG. 17). This permits the shifting movement of the sensors 260 and 270 toward the left to be executed before they start with the sensing of the mult-members 30 in order that the sensing edges 272, 273 and the sensing edge 261 will not abut against the steps.

*Subtraction control of the distributor counter registers*

The control of the distributor counter registers 69, 70 set in their rest position to addition, is similarly carried out for subtraction by means of rod 278 (FIGS. 17 and 18) fastened to the subtraction sensor 256. This rod 278 (FIG. 23) engages a slot 295 of a lever 297 which is rotatably mounted upon a frame-mounted pin 296. After performing the scanning motion of the subtraction sensor 256, lever 297 is turned counter-clockwise rotating an intermediate lever 298 mounted upon rod 289 in the clockwise direction, which lever 298 has a flange 298' acting on a hook 299 resting on the key lever 14'. The key lever 14' is linked to the minus key 14(−) (FIG. 1). The hook 299 (FIG. 23) is connected thereto by means of a spring 301. Owing to the action of the intermediate lever 298, it is moved downward counter to the action of the spring 301 and engages in this operation a clamp yoke 302 mounted between the arms 303 of a shaft 304. The shaft 304 (FIG. 23) is, at the proper moment, rotated in the clockwise direction, thus engaging the key lever 14' which shifts the distributor counter registers to be connected to subtraction. For this purpose, the lower end of key lever 14' engages a pin 305 in a slot 306 of the connecting link 147 (FIG. 11) already described above, so that the latter shifts the pushers 117, 118 out of the addition position indicated in FIG. 11, toward the left into the subtraction position.

*Engaging control of the distributor counter registers*

The shaft 289 (FIG. 8) already referred to, has a pair of arms 307 mounted thereto, which arms, together with lower connecting bolt 308, form a rocker frame. The bolt 308 also carries a scanning pawl 309 cooperating by means of its sensing edge 311 with the abovementioned edge 277 of the main sensor 260 and the upper surface of the flange 269 of the engaging sensor 270. The connecting bolt 308 is also engaged by the end of the connecting rod 154 (FIG. 11) transmitting the control of the engaging of the distributor counter registers 69, 70 by a corersponding turning of the rocker arm 127. Under the effect of its spring 155. the connecting link 154 (FIG. 11) tends to move to the left and, in this process, carries the scanning pawl 309 (FIG. 8) along toward the left. This may occur if, as illustrated in FIGS. 17 and 2, the flange 269 is positioned completely in the recess 271, because the scanning edge 311 (FIG. 8) can then slide unimpeded over the top surface of the deflection 269. In this case, the rocker arm 127 (FIG. 11) is turned in the clockwise direction via the connecting link (FIG. 11) so that its cutout 129 will be positioned above the pin 124 and its cutout 131 above the pin 125 and, upon actuation by the cam disk 168, both distributor counter registers 69 and 70, respectively, will be engaged with the gear racks 63 and 64 (FIG. 13) at the beginning of the second half of the machine cycle. However, if the flange 269, as can be seen on FIGS. 8 and 23, is raised above the edge 277 of the main sensor 260, the scanning pawl 309 (FIG. 8) is stopped by the lateral edge of the flange 269 so that the rocker arm 127 remains in the position illustrated in FIG. 11. When actuated by the cam disk 168, only the cutout 129 is engaged by the pin 125 and thus, only the distributor counter register 69 is engaged. FIGS. 8 and 23 also indicate that the lifting out of the flange 269 from the recess 271 occurs in all those cases when the engaging sensor 270 is prevented from moving just as deep as the main sensor 260 by being caught with one of its scanning edges 272 or 273 by an adjoining (higher) step of the mult-member 30. According to FIGS. 8 and 23, the main sensor 260 scans the step 208 (see FIG. 4) and the engaging sensor 270 with its sensor edge 273 (FIG. 8) the higher step 209. The sensing edge 272 cooperates only with the descending steps 205, 206, 211, and the sensing edge 273 only with the ascending steps 208, 209 and 210, whereas in the case of the step 207, corersponding to the numerical value "5," both sensing edges come to rest on the two adjacent steps 206 and 208.

*Control of the machine cycles during multiplication*

Following completion of the machine cycle for the setting of the mult-members 30 to the multiplier digits, the multiplicand is in the previously mentioned manner entered into the pin setting carriage 26 by means of the digit keys 10 and 11, and said carriage is set by decade transverse displacement via the control members 35, and then the multiplicand key 21 (=) is depressed. Thereupon, automatically, the following machine cycle series are actuated, each one of which being intended for the sensing of a set mult-member.

With the first machine cycle of the first series, there occurs in the first half of the coupling of the pin setting carriage 26 with the mult-carriage 235, the idling of the control members 35 in accordance with the multiplicand entered into the pin setting carriage, and the scanning motion of the sensors for the control action of the distributor counting registers, and the additive and subtractive engagement in the control members, as well as the determination of the individual machine cycles to be performed during this series. Thereupon, the multiplicand is printed and then the printer is disconnected for the duration of the multiplication operation. In the second half of this first operation, the multiplicand is transferred to the engaged distributor counting registers. The same cycles, with the exception of the printing of the multiplicand and the scanning of the mult-members, occur during the subsequent machine cycles of the first series. Then, the multi-carriage and the pin setting-carriage are displaced by one decade position toward the left of the machine and then the processes mentioned regarding the first series are substantially repeated.

Following completion of the last machine cycle of the last series, the pin setting carriage 26 and the multi-carriage 235 independently return to their initial position after disengagement from one another.

On one end of shaft 239 guiding the multcarriage 235 (FIG. 17) there is mounted an arm 312 and, on its other end, a step control lever 313. Both levers are inter-connected at their upper ends by means of a rod 314 (FIGS. 8, 9) and, together with the shaft 239 they form a rocker frame. The rod 314 protrudes through curved slots 315, 315' of the side walls of the mult-carriage 235, as well as through a fork 316 of the carrier lever 257. At the beginning of the scanning, operation, each mult-member 30, depending on scanning depths of the main sensor 260, may be accompanied by zero to three machine cycles. The rocker frame components 239, 312, 313, 314 including the step control lever 313 is turned clockwise (FIG. 17) in order to be returned step-by-step into its initial position in the course of this machine cycle and during the subsequent machine cycles of the series whereby each return step is assigned a machine cycle with a transmission of the multiplicand to one or both distributor counting registers 69, 70. The right arm 317 of step control lever 313 (FIG. 9) is provided with a ratchet gear 318 which cooperates, with an anti-return pawl 321 controlled by a spring 319 having a tooth 322 and further cooperates with a trip wal 323 having one tooth 324. Trip pawl 323 is pivotally connected to one of the sliding levers 326 by pin 325. Levers 326 are pivotally mounted to the bearing rod 223 already referred to above and connected by a spring 327 with the trip pawl 323, and, by means of pin 230, is also connected to the rod 231 (see also FIG. 2) that has likewise already been described above. The rod 231, as was previously described, is reciprocated once during each machine cycle by the cam disk 234 (FIG. 2), namely, at the beginning of the first half of the rotation of the main shaft drive 46 toward the left and, at the end of the first half of rotation, toward the right, whereby the trip pawl 323 is eventually moved upward and then downward by one gear increment back and forth while the step control lever 313 is shifted step-by-step by one unit upward. The anti-return pawl 321 maintains control lever 313 in the respective position achieved, at the pin 287 (FIG. 9). A slide rod 328 is pivotally mounted on pin 287, which slide rod, under the effect of a spring 329, rests on a pin 331 of the key lever 21' of the multiplicand key 21 (=). The slide rod 328 is simultaneously influenced by an angle lever 332, which is connected by means of a link 333 and a control lever 333*a* having a slot connection 334 with the key lever 21', as well as by a spring 335.

Upon depressing of the multiplicand key 21 (=) the pin 331 reaches the position 331' and, simultaneously, the angle lever 332 is turned counterclockwise so that the slide rod 328 is released to come under the influence of its spring 329, which moves it downward so that its bearing surface 336 abuts a lateral pin 337 integral with and projecting from the step control lever 313. In this operation, a bolt 338, which is mounted in the slide rod 328, reaches the position 338' where it is positioned between the opposing arms of a fork 339 of the slide lever 326 so that, during the left-hand movement of rod 231 (FIG. 9) occurring at the beginning of the rotation of the drive shaft 46 (FIG. 2), the right-side notched arm of the fork 339 moves the slide rod 328 toward the left. In this operation, via the pin 287, the lever 285 is turned counterclockwise thereby causing the following movements:

The pawl 292 (FIG. 9) has its flange 341 bearing upon the side edges of trip pawl 323 and the anti-return pawl 321 disengaging these pawls from the ratchet gear 318 which, as indicated, is fixedly connected with the rod 314 running through the mult-carriage 235 and passes through the fork 316 (FIG. 17) of the carrier lever 257. As described above, the rod 282 affixed to the lever 285 abuts the bearing surface 294 of the carrier lever 257 thereby preventing, for the time being, a movement of the step control lever 313 in clockwise direction. With the turning of the lever 285 in the counterclockwise direction, the rod 282 is also lowered. It releases, first, the bearing surfaces 279, 279' (FIG. 17) of the shift sensor 255 and then releases the subtraction sensor 256 so that these two sensors under the effect of their springs 259, can perform their scanning motion of the two mult-members 30 with which they cooperate. If the rod 282 has then slid off the lower end of the bearing surface 294, the carrier lever 257 is also released thus permitting the main sensor 260 and the engaging sensor 270 to perform their scanning movements. In this operation, the carrier lever 257, pivots about rod 239 through an angle corresponding to the scanning depth achieved by the main sensor 260, i.e., zero to three step elevations by a corresponding angular amount to move the rod 314 thereby releasing step shift lever 313 so that its ratchet gear 318 as well as the pin 337 can move generally downward until the main sensor 260 is stopped by a step of the mult-member 30.

At the end of the first half of the first machine cycle, of each series of machine cycles assigned to a mult-member 30, the sensors complete their scanning movement. The distributor counter registers to be engaged are selected and are, if necessary, set to subtraction, and the number of introductions of the multiplicand into the distributor counting registers is determined. With the downward movement of the pin 337 (FIG. 9), the bolt 338 moves out of the position 338' into the position 338'' in a curved slot 341 in which said bolt and therefore the slide rod 328 remains uninfluenced during the subsequent rocking movements of the rocker lever 326.

During the motion toward the left of the rod 231 occurring at the end of the first half turn of the drive shaft 46 (FIG. 2) the pawl 292 (FIG. 9) is somewhat retracted toward the left so that the trip pawl 323 and the anti-return pawl 321 can again engage the ratchet 318. Thereupon, with further movement toward the right of the rod 231, the step control lever 313 is moved by one angular unit in the counterclockwise direction. During the second half turn of the shaft 46, the given multiplicand, as already pointed out, is additively or subtractively transmitted to the distributor counting registers controlled by the sensors. During retraction, with each movement toward the right of the drive shaft 231, the pin 337 approaches the bearing surface 336 in the subsequent machine cycles by one shift step at a time and the rod 314 is thereby moved back toward the left by one shift step.

There is provided another device that is known and therefore not described in greater detail and that makes the slip lever of the single rotation clutch of the main drive shaft 46 inoperative as long as the slide rod 328 is situated in a position below its uppermost one illustrated in FIG. 9 so that, subsequent to the first machine cycle described, there follows automatically, after depressing of the multiplicand key 21 (=), immediately additional machine cycles which continue until the slide rod 328 has been returned into its initial position and the step control lever 313 has performed a number of control steps corresponding to the scanning depth of the main sensor 260 and an identical number of machine cycles has been actuated with each transfer of the multipilcand to the controlled distributor counting registers 69, 70. In this process, the number of the engaged distributor counting registers may be different during individual return steps of the step control lever 313.

During the last return step of the step control lever 313 in the last-highest multiplier digit, the (=) key lever 21' is released which, with its pin 331, returns the slide rod 328 into its initial (solid line) position illustrated in FIG. 9. Owing to its slotted connection 334, its rounded off extremity 342 presses the angle lever 332 back and places itself again above the lower projection 332*a* of the angle lever 332 whereby the effect of the slide lever 328 for the subsequent transfer of the totalled amount from one distributor counting register into the other one is disconnected.

*Step control mechanism for setting pin carriage and mult-carriage*

In order to adjust the mult-carriage 235 (FIG. 8) in sequence to given mult-members 30, a follower pawl 349 (FIG. 9) acts on the shift lock mechanism 32 (FIG. 5) for the pin setting carriage 36 coupled with the mult-carriage 235, which follower pawl is pivotally connected by means of pin 350 to a shift lever 348 which is pivotally mounted upon a stationary pin 347 and is further connected to lever 348 by means of a tension spring 351. The spring causes lower edge 352, which is notched, to bear against the lug 346, while the shift lever 348 normally bears against a stationary lug 353 likewise under the effect of the tension spring 351. During the movement toward the left of the slide rod 328, the lug 346 slides over the edge 352 until the pawl 349, having notch 354, snaps in over the lug 346 and connects the shift lever 348 with the slide rod 328 so that the shift lever 348 by means of its arm 355 can, during the movement toward the right of the slide rod 328, act on a shift lock lever 357 whose lug 356 (FIG. 10) also is actuated by the digit keys 10 and 11 upon entering a given amount. The lug 356 is affixed to the shift lock lever 357 (FIG. 10), which is pivotally mounted upon a stationary pin 358 and which cooperates in a well known manner with the gearing 361 of the pin setting carriage 26 with the aid of a locking pawl 362. At the end of the movement toward the right of sliding rod 328, the upper arm of the follower pawl 349 runs onto the stationary lug 353 and disengages the connection between the slide rod 328 and the shift lever 348.

*Transfer of the sum from one distributor counting register to another*

As already suggested above, the rocker arm 128 (FIGS. 11 and 14) serves only for additively engaging the distributor counting register 70 in the transfer operation following the gathering of the subproducts in the distributor counting mechanisms 69, 70, in order to provide to the distributor counting register 70 the totalized amounts gathered from the distributor counting mechanism 69.

In the first half of this transfer operation, the sum is taken out of the distributor counting register 69 and this counter is cleared, whereas the amount picked up by the control members is, in the second half of the same machine cycle, transferred to the distributor counting mechanism 70 so that, at the end of this machine cycle, the control members 35 and the distributor counting mechanism 69 are positioned on zero and the distributor counting mechanism 70 contains the end product of the multiplication, which is then imprinted automatically immediately following the totalization machine cycle.

As already mentioned above, the rocker arm 128 (FIGS. 11 and 14) maintains its inoperational central position in which it is inoperationally moved upward and downward during each multiplication operation between the lugs 124 and 125 by the angle lever 136. The pin 156 holding it is seated on a rod 364 rotatable around a stationary lug 363 (FIG. 14) which, as described below, is moved counterclockwise in order to bring the rocker arm 128 toward the left through a movement of the pin 156, whereby its recess 132 at its lower end is positioned above the lug 124 of the rocker element 122 for the distributor counting register 70.

The depressing multiplicand key 21 (=) causes, via the key lever 21' (FIG. 14) and a connecting rod 365 resting on the key lever 21' by means of the bolt 365', lever 366 to turn counterclockwise around a stationary lug 367 whereby the connecting lug 368 for the connecting rod 365 rotates lever 371, pivotally mounted on stationary lug 370, in a counterclockwise direction by means of a specifically shaped opening 369. Pin 372 of the lever 366 engages a pawl 373 and moves the latter out of the range of the above mentioned retracting rod 85 for the type wheel lever 63 (FIG. 3). The detent 373 is pivotally mounted to a locking lever 375 which, in turn, is pivotable around a stationary pin 374 and normally biased by means of a spring 376 so that a flange 377 of the detent 373 bears against one edge of the catch lever 375.

Following rotation of detent 373 in the clockwise direction and of the lever 371 in the counterclockwise direction, the catch lever 375, under the effect of its spring 378 is enabled to move its catch 375' above a pin 379 of the lever 371 and lock the latter in its deflected position so that it releases the lower end 428 of a pawl 427 by lifting pin 431, said pawl being pivotally positioned on a bolt 429 provided on lever 366. This releases the lever 381 which under the influence of a tension spring 430, is turned clockwise into a position in which the pawl 427 is stopped by the bent part 425 of the roller lever 423. In this operation, the roller 424 of the lever 423 is in sliding engagement with a cam disk 426 which is fastened to the main shaft 46.

In this first half of the first machine cycle of a multiplication operation, the roller lever 432 turns clockwise, whereby its ear 425 releases the pawl 427 which thereby places itself with its step 428 behind the ear 425. Following printing of the multiplicand at the beginning of the second semirotation, the roller lever 423 is returned into its initial position whereby the lever 381 is turned clockwise via the pawl 427. The bolt 432, connected by means of a spring 433 with the arm 87, is in this operation caught by the latch 434 and maintained in this position. By means of the lever 381, the printer is then disconnected in the per se known manner. At the same time, the pin 383 of the lever 381 releases a hook member 382 having a notch 384 which engages pin 385 of the rod 364 in order to prepare for the displacement of the rocking lever 128 toward the left. Thereupon, during the first machine cycle occurring after the depressing of the multiplicand key, the multiplicand is printed and preparation is made for the disconnecting of the print mechanism during subsequent machine cycles. Furthermore, preparation is made for the additive engagement of the distributor counting register. This change-over of the rocker arm 128 is performed after completion of the sensing operation, as follows:

During each final machine cycle of each series of operations assigned to a sensed mult-member, a sensor lever 395 (FIG. 14, left) pivotally mounted on a shaft 239, and laterally displaced with the mult-carriage from mult-member to mult-member, is released and turned counterclockwise. Its rotation is prevented if it is not faced by a recess 394 of the mult-member 30. At the end of the last subproduct machine cycle, the upwardly projecting flange 396 of the sensor lever is faced by the recesses 394 of the mult-members 30 which are no longer set to any multiplier digit value. The sensor lever can now unimpededly engage these recesses so that its upper arm 397 lifts a rod 398 which turns a locking band 400. The locking band 400' is pivotally mounted on rod 399 and is normally under the influence of a spring 406. Upon clockwise rotation, its bent forward portion **400*a* lowers and thereby releases the (=) key lever 21'. The intermediary rod 365 pivotally connected to the key lever 21' via the connecting lug 365' and to the lever 366 by lug 368, returns the lever 366 into its initial position while the hook 382 displaces the rod 364 by means of the pin 385 which rod, by means of its pin 156, carries the rocker arm 128 towards the left and places the notch 132 above the pin 124 of the balancer 122**.

At the same time, via the cam slot 388, the pin 385 moves a disengaging lever 386 clockwise around its stationary point of support 387 thereby placing a hook 389 situated at its left end in front of a pin 391 of the lever 392 thereby blocking lever 392.

The tilting of the selector lever 395 accompanied by simultaneous lifting of the rod 398, causes hinged rod 403 to be raised via the tie rod 401 to such a point that its left end 405 is positioned in front of a pin 410 of a counterlever 393 and its step 404 is positioned in front of the pin 402 of an engaging link 402'.

At the end of this machine cycle following the terminated sensing, a lifting cam 422 on drive shaft 46 bears against roller 420 of roller lever 419 tilting the roller lever 419 to the left thereby causing its pin 421 to move the hinged rod 403 along in the left-hand direction so it will first tilt the counter-lever 393 which will then through its flange 393' bring the totalizing key hook 407 into engagement with the clamping yoke 302 thereby bringing the coupling bolt 177 into the position 177' (see FIG. 11) at the beginning of the following machine cycle.

Subsequent thereto, the step 404 of the link 403 actuates the tripping lever 402' which then releases in a per se known manner the clamping yoke 302 which is preparing a totalizing operation via a totalizer key hook 407 for the following machine cycle thereby taking the subproduct out of the distributor counting register 69 via the rocker arm 127 in the first half of the machine cycle and adding it on the distributor counting register 70 by means of the rocker 128 in the second half of the machine cycle, to form the final product. At the end of this machine cycle, the retracting rod 85 of the printer sizes the pawl 373 which is released by the pin 372 so that the stop lever 375 and the rod 344 pivotally connected thereto by rivet 344', causes the lower end of rod 344 to be moved upward under control of the guide pin 380 provided on detent 434 and riding in slot 345. Pawl 373, under control of guide pin 380 via the stop lever 375 releases the rod 344 causing the detent 434, pivotally mounted on the pin 435 and being under the action of the spring 436, to engage with the lever 381. At the same time, the lever 371 also returns to its initial position and in the process detaches, via its pin 431, the pawl 427 from the flange 425 so that the lever 381 is likewise capable of returning into its initial position and the printer is reconnected to its operating state. The pin 383 also uncouples the attachment hook 382 from the pin 385 by lowering it thereby also permitting rod 364, the rocker arm 128 and disengaging lever 386 to return into their initial positions.

Subsequently, by means of the roller lever 419 and the rod 403, the counter-lever 393 and the lever 392 are pivoted, both of which cause engagement of the totalizer key hook 407 and the key hook 408 for the distributor counter register 70 with the clamping yoke 302, thereby preparing for a totalizing operation, via key hook 408 during the following machine cycle. Totalizing key hook 407 turns lever 438 in the clockwise direction which, via the pins 413 and 415 of rod 414, moves the control track 151 to the left until the lug 149 moves the notch 129 of rocker arm 127, through its cut-out 131, over the lug 124 of the rocker arm 122 (FIG. 3) so that, at the following machine cycle, only the distributor counting register 70 will be actuated. The sum is finally extracted from register 70 and simultaneously imprinted. In this operation, the flanged portion 151' of the control track 151 separates a stop lever 416 from the pin 412 and releases a lever 411 which had until that point, locked the continuous operation of the machine.

Following completion of this machine cycle all control members for the multiplication return into their inoperative position.

*Numerical example*

The following operations occur during mechanical calculation of the example $152 \cdot 3826 = 581,552$ The multiplier "3826" has its digits keyed into the machine first.

By means of the digit keys 10 and 11, the multiplier "3826" has its digits keyed into the pin position carriage 26 one after another, beginning with the highest decimal place. In this operation, the pin position carriage is moved step-by-step toward the left-hand side of the machine and set with the keyed position pin rows by means of the control members 35 (FIG. 2). Then, the multiplication key 20 (×) is depressed thereby actuating a machine cycle during the first half of which the control members 35 adapt themselves idly together with the respective type segments to the multiplier on the set position pins 27' (FIG. 3) of the position pin carriage 26. The said type segments subsequently imprint the multiplier on the tape.

The engaging device for the distributor counting registers remain inoperative during this operation so that the multiplier does not reach the distributor counting registers. Following the completion of the first half-period of this initial machine cycle, the mult-members 30 are coupled with the control members 35 (FIG. 2) via the lever 200 and the intermediary slider 197 so that the mult-members 30 are set to the respective multiplication digits upon retracting of the control members 35 into their initial position. Cancelling the set position pins, the position pin carriage 26 returns into its initial position.

Now, by means of the digit keys 10 and 11, the multiplicand "152" is keyed into the pin position carriage 26, moving the latter in this operation with each digit keying by a spacing of one decimal place toward the left-hand side machine. Then, by depressing of the multiplicand key 21 (=), the multiplication process, consisting of a series of continuous machine cycles, is actuated. During the first half of the first multiplication machine cycle, the control members 35 are brought forward idly to the set position pins 27' while the mult-carriage 235 stands in its initial position on the right, and the multiplicand is imprinted on the paper tape. Thereafter, the printer is disconnected for the time being.

As a result of depressing multiplicand key 21 (=), the sliding link 328 (FIG. 9) is also released from the key lever 21' and the angle lever 332 so that its pin 338 reaches the position 338'. During the deflection of the rod 231 occurring at the beginning of the machine cycle toward the left, the sliding link 328 is taken along, said rod thereby moving the three-arm lever 285 in counterclockwise direction lifting pawls 321, 323 out of the ratchet toothing 318 thereby releasing the step control lever 313 for a clockwise rotation of the ratchet toothing, said rotation being limited by the sensing of the main sensor 260 (FIG. 17). At the same time, a rod 282 (FIG. 9) is also lowered, releasing in a predetermined sequence the sensors pivoted on the mult-carriage 235 (FIG. 17). The shifter sensor 255 is held by pin 268 (FIG. 7) in its upper position so that the main sensor 260 (FIG. 17) and the engaging sensor 270 cannot shift to the left, and the main sensor 260 scans the digit position 6 of the unit digit mult-member 30, which has a sensing depth of two units. Accordingly, the step control lever 313 can also move by only two units in clockwise direction. This means that only two machine cycles can be actuated in this position of the mult-carriage. At the same time, the rod 314 turns the clutch finger 242 (FIG. 24) into a notch 243 of the position pin carriage 26 and the coupled connection to the latter and to the mult-carriage 235 is established.

The engaging sensor 270 comes to rest with its sensing edge 273 on the digit site 7 (FIG. 4) so that the surface of its flange 269 (FIG. 17) remains flush with the edge 277 of sensor 260 and the sensing edge 311 (FIG. 8) can slide during its movement toward the left across the deflection 269, resulting in a positioning of the rocker arm 127 (FIG. 11) over both lugs 124 and 125 causing both distributor counting registers 69 and 70 to be prepared for engagement.

The subtraction sensor 256 (FIG. 18) drops upon sensing since the mult-member in question is set to "6," which means that the key lever 14' (FIG. 23) is moved toward the left and takes the rod 147 (FIG. 11) along to the left so that the two pushers 117, 118 (FIG. 11) are turned into their subtraction position and both distributor counting registers 69 and 70 are prepared for subtraction. Thus, two machine cycles occur in the case of this mult-member. In the second half of the first one of these machine cycles, the multiplicand "152" is transmitted to each distributor counting register. With each downward movement of the step control lever 313 (FIG. 9), the sliding rod 328 with its pin 338 resting on the pin 337 moves within the curved slot 341 of lever 326 and the pawls 321, 323 are again able to engage the ratchet toothing 318 in view of the fact that the pawl 292 is appropriately retracted.

During the execution of this machine cycle, the rod 231 (FIG. 9) is pulled toward the right resulting in a shifting of the step control lever 313 clockwise by one unit, causing the pin 337 to be moved back substantially to its initial position.

In view of the fact that the catch hook 439 (FIG. 23) for the single revolution clutch 440 was for the time being made inoperative in per se known manner by the engaging rod 437 and the lever 411 by means of the pin 413 as well as the stop lever 416, this first machine cycle for the sensing of the unit-digit mult-member is immediately followed by a second machine cycle in which one must take into account that the main sensor 260 including the engaging sensor 270 has moved up by one step elevation and that the setting of the shifting sensor 255 and of the subtraction sensor 256 has not changed. Thus, an amount of −152 is once again fed into each one of the two distributor counting registers so that, as a result of the sensing of the unit-digit mult-member, a sum total of −608 was introduced into the distributor counting registers (−304 in each register). During this second machine cycle, the pin 337 (FIG. 9) strikes the bearing surface 336 lifting the sliding rod 328 with its pin 338 back into the position 338', the sliding rod 328 and the rod 343 having previously returned to their right-hand terminal positions.

The control lever 348 is coupled, at the beginning of the third machine cycle with the right-hand movement of rod 231, with the rod 343 by means of the follower pawl 349 and is turned clockwise with the retracting of the rod 343, as a result of which the switch lock 357 (FIG. 10) shifts the mult-carriage 235 coupled with the pin position carriage 26 by one decade into the range of the mult-member 30 set for the digit "2" of the decimal place of the multiplier.

At the beginning of the third machine cycle, rod 231 via rocker lever 326 causes a movement of slider rod 328 toward the left resulting in a sensing of the decimal mult-member 30 by the sensors, in which the decimal mult-member 30 determines: the number of machine cycles assigned to it; their plus or minus sign and their control selection by the sensors. There now follow corresponding control events after the moving of the mult-carriage 235 into the hundreds and thousands decimal places. These operations are indicated in the table below summarizing in readily understandable manner the sensing of the individual mult-members.

The first column refers to the mult-member sensed, the second one to the multiplier digits to which the mult-members are adjusted, the third one indicates whether the main sensor is or is not to be displaced by the shift sensor by one unit toward the left, the fourth one indicates the number of individual machine cycles performed for each mult-member, the columns five and six shown which total is transferred for each mult-member to both distributor counter registers, the columns seven and eight indicate the manner of distribution of the sum total over the two distributor counter registers, and columns nine and ten indicate the total minus and plus amounts that make up the grand total. Both additions indicate that the correct product 581,552 is obtained, namely with only 7 machine cycles to which, in addition, the machine transfer cycle from the one to the other distributor counter has to be added.

The subsequent totalizing operation for the grand total in order to print the product takes place with all calcula-

| 1 | 2 | 3 | 4 | | 5 | 6 | 7 | | 8 | | 9 | 10 |
|---|---|---|---|---|---|---|---|---|---|---|---|---|
| Mult-member | Mult. Digit | Shift Main Sensor | Indicates machine Cycles | | Amount | Add-Sub | Distributor Counter Register | | | | Sums | |
| | | | | | | | I | | II | | − Sums | + Sums |
| Unit's digit | 6 | No | 2 | 4. | 152 | − | − | 304 | − | 304 | 608 | |
| Tens | 2 | Yes | 2 | 3. | 1520 | + | +2. | 1520 | +1. | 1520 | | 4560 |
| Hundreds | 8 | No | 1 | 2. | 15200 | − | − | 15200 | − | 15200 | 30400 | |
| Thousands | 3 | Yes | 2 | 4. | 152000 | + | +2. | 152000 | +2. | 152000 | | 608000 |
| | | | 7 | | | | | 291536 | | 290016 | −31008 | +612560 |
| | | | | | | | | 290016 | | | | −31008 |
| | | | | | | | | 581552 | | | | 581552 |

tion methods A to C and is irrelevant for comparative purposes.

In the sensing of a decimal mult-member there are three introductions of multiplicands owing to the fact that the main sensor is shifted from the digit place 2 to the digit place 3 thereby increasing the sensing depth of the main sensor to two. Although a shifting of the main sensor does occur also with the thousands mult-member, the latter nevertheless retains its sensing depth of two step elevations.

Following completion of the subproduct calculation, the distributor counting register 70 contains the amount 291,536 and the distributor counting register 69 the amount 290,016.

This is followed automatically by a machine cycle in which, during the first half-cycle, the amount of 290,016 is by way of totalizing taken over by the control members out of the distributor counting register 69 and is in the second half-cycle additively fed to the amount 291,536 of the distributor counter register 70 thereby obtaining in the latter distributor counter register the amount of the product, namely 581,552.

There now follows automatically the final machine cycle in which the sum is taken out of the distributor counting register 70 and is imprinted, thereby resetting both distributor counter registers 69, 70 and returning all machine parts to their initial position.

The embodiments of the invention in which an exclusive privilege or property is claimed are defined as follows:

1. A calculating machine for performing multiplication with an abbreviated number of sequential additive or subtractive operations, respectively, of the multiplicand wherein the number of machine cycles for each decimal place of the multiplier, correspond to the value of the individual multiplier digits 1–5 or to the complementary value of the individual multiplier digits 6–9, respectively, characterized by the fact that the sum total of the required machine cycles assigned to the given multiplier digits is reduced, said calculator comprising at least two movably mounted distributor counter registers; means for storing a multiplicand; means for storing a multiplier; means sensing said multiplier storing means for transferring an addition or subtraction of the multiplicand for each individual multiplier digit sensed to said registers; means selectively coupling said registers to said transferring means for distributing the addition or subtraction among two or more distributor counter registers; second means for transferring the accumulated amounts of all but one of the distributor counter registers into said one distributor counter register to form the final product; a plurality of mult-members associated with each multiplier digit and longitudinally movable by an amount corresponding to the numeric value of the multiplier digit, one edge of each of said mult-members being notched to form a row of steps descending with increasing multiplier digit value for the digits 1–5 and a row of ascending steps for the digit values 6–9 with each scanned step elevation corresponding to one machine cycle, characterized by the fact that, except for the step 5, each step is assigned a number corresponding to that of the distributor counter registers used of multiplier digits following one another in the natural series; said means for sensing the position of each mult-member, for each multiplier digit, including means for enabling transfer of the multiplicand from said first transfer means during each machine cycle corresponding to a scanned elevation in each case only once into one or more than one distributor counter register.

2. A device according to claim 1, characterized by the fact that, each mult-member is provided with a notched portion consisting of descending and ascending steps wherein multiplier digits 1 and 2 as well as 8 and 9 are each asigned first and second steps, respectively, of a scanning depth corresponding to one step elevation, the multiplier digits 3, 4 as well as 6, 7 are each assigned third and fourth steps, respectively, with a scanning depth of two step elevations in each case and that the multiplier digit 5 is alone assigned a fifth step with a scanning depth corresponding to three step elevations; said first, second and third elevation steps, when sensed, initiating first, second and third transferring operations, occurring during first, second and third machine cycles, respectively.

3. The device according to claim 1 characterized by the fact that, the sensing means for scanning the mult-members is a mult-carriage assembly comprised of a main sensor for determining the number of machine cycles required for a scanned mult-member in accordance with its scanning depth, a shift sensor for sensing the setting position of the next lower mult-member to control the shifting of the main sensor by one digit unit as a function of the setting of the next lower mult-member, an engaging sensor for controlling the selection of the distributor counter registers to engage said first transferring means as a function of the shifting of the main sensor; and a subtraction sensor for determining whether the multiplicand is to be added to or subtracted from the distributor counter registers that are engaged, as a function of the setting position of the scanned mult-member by selectively moving said registers into additive or subtractive engagement with said first transfer means.

4. The device according to claim 3, further comprising spring means biasing said main sensor in a first direction; means coupled between said shift sensor and said main sensor to retain said main sensor in its normal position counter to the action of said spring with respect to the scanned mult-member; said retaining means being movable to release the shift sensor to permit its advance by one digit unit, when the shift sensor, in its scanning movement of the next lower mult-member is prevented from releasing the main sensor due to a decimal setting of the mult-member above the numeral value 5.

5. A device according to claim 2, further comprising control means for sensing the relative displacements of the main sensor and the engaging sensor in the sensing of a mult-member to control the selection of the distributor counter registers to be engaged by said first transfer means during each machine cycle.

6. A device according to claim 5, wherein the engaging sensor is provided with a flange for engaging the main sensor; and said main sensor is provided with a recess for normally receiving said flange such that the engaging and main sensors together form a continuous substantially planar surface, said control means having a sensing edge for engaging said surface for the selection of the distributor counter registers to be engaged by said first transfer means, said sensing edge being restrained by said flange in the case of a difference in levels between the engaging and main sensors to control the engaging of only one of the two distributor counter registers, whereas in the absence of any difference in levels said sensing edge is unrestrained causing both distributor counter registers to be engaged by said first transfer means.

7. A device according to claim 4, further comprising means coupling the main sensor to the engaging sensor to provide for a joint displacement movement parallel to the longitudinal direction of the mult-members, said coupling means enabling the engaging sensor to execute a rotating motion with respect to the main sensor.

8. The device according to claim 5, characterized by the fact that said main sensor is provided with a sensing edge and said engaging sensor is provided with first and second sensing edges spaced from one another and arranged in digit spacing on either side of the sensing edge of the main sensor; said engaging sensor being positioned relative to a mult-member being sensed so that the first sensing edge of the engaging sensor is positioned to engage descending steps and the second sensing edge is positioned to engage ascending steps of the mult-member being sensed.

9. The device according to claim 8, characterized by the fact that, said mult-carriage assembly comprises means for controlling the scanning movement of the sensors to release the shift sensor and the subtraction sensor and then the main sensor and engaging sensor in that order, to prevent a striking of the sensing edges of the main sensor and the engaging sensor against the mult-member being sensed.

10. The device according to claim 9, further comprising a carrier lever for jointly supporting the main sensor and the engaging sensor to control the scanning movement of these two sensors.

11. The device according to claim 4, comprising stop means for preventing the shift sensor from releasing the main sensor when the shift sensor is positioned to sense the unit digit position mult-member.

12. The device according to claim 11, characterized by the fact that the shift sensor and the subtraction sensor are each provided with a stop face, and that the carrier lever supporting the main sensor and the engaging sensor, respectively, is provided with a stop face; spring means for biasing said shift sensor, said subtraction sensor, said carrier lever and said main sensor in a first direction, said control means moving in a first direction across the stop faces of all of said sensors counter to their spring tension; said stop faces each having notches which are so positioned that, the shift sensor and subtraction sensor are released first for scanning and that the carrier lever and the main sensor and engaging sensor are released next to perform their scanning operations, as said control means moves across said stop faces in a second direction opposite said first direction.

13. The device according to claim 6, further comprising a rocker arm under control of said control means; means coupled between said control means and said rocker arm for rotating said rocker arm to engage one of the two distributor counter registers or both distributor counter registers by means of the control member scanning the sensor edge and for linearly moving said rocker arm to drive one or both of said distributor counter registers into engagement with said first transfer means.

14. The device according to claim 3, further comprising first and second subtraction control members coupled to a first and a second distributor counter register, respectively, and being normally set for addition and movable to a subtraction position, said subtraction sensor being coupled to both said first and second subtraction control members to set said subtraction control members over to subtraction when the mult-member being sensed is moved to a position representing a multiplier digit greater than 5.

15. The device according to claim 3, further comprising a shaft for pivotally mounting said mult-carriage assembly; means for moving said mult-carriage assembly laterally relative to said mult-members; a swivel arm assembly rigidly coupled to said shaft controlling the scanning movement of all of the sensors; a step control lever arm coupled to said swivel arm assembly being rotated in a first direction by an amount corresponding to the step elevation of the mult-member being scanned by the main sensor; means for returning said step control lever arm to its initial position in incremental steps with each step being associated with a machine cycle during which the multiplicand is being selectively added or subtracted.

16. The device according to claim 15, wherein said means for returning the step control lever arm to its initial position is comprised of a rotating cam disk; a drive rod reciprocally driven by said cam disc; a pivotally mounted rocker arm; pivotally mounted pawl means coupled to said rocker arm for driving said step control lever toward its initial position in a stepwise fashion.

17. The device according to claim 16, further comprising a sliding rod; a multiplicand key assembly having a multiplicand key and being set for normally supporting one end of said sliding rod out of engaging with the rocker arm and being movable upon depressing of said key to lower said slider arm into driving engagement with said rocker arm.

18. The device according to claim 17, wherein said rocker arm is comprised of a pair of arms extending toward one another and an inverted, substantially Y-shaped notch; said sliding rod having a pin and being movable to a first position below said pair of arms so as to be unaffected by the reciprocating rocker arm; said step control lever, upon reaching its initial position, being adapted to lift said sliding rod to move said pin to a second position between said pair of arms to reset said multiplicand key assembly.

19. A calculator for performing multiplication comprising:

first settable means for selectively receiving a multi-digit multiplier and a multi-digit multiplicand;

manually operable keyboard means for sequentially entering the multiplier and the multiplicand in that order to set said settable means; said keyboard means further including function key means;

a plurality of slidable mult-members being movable into discrete positions for representing the digits of the multiplier;

first transfer means operable by said function key means for setting said mult-members in accordance with the multiplier in said first means;

second transfer means;

first and second movably mounted register means being normally disengaged from said second transfer means;

said second transfer means being releasably coupled to said first means when said multiplicand is stored therein for transferring said multiplicand to said registers;

sensing means for sequentially sensing the mult-members;

third means coupled to said sensing means for positioning said registers to make additive engagement with said second transfer means when said sensing means senses a mult-member representing a multiplier digit having an integer value between 1 and 5 and for positioning said registers to make subtractive engagement with said second transfer means when said sensing means senses a mult-member representing a multiplier digit having an integer value between 6 and 9;

multi-position driving means for driving said second tranfer means to enter the multiplicand into said register means within three machine cycles;

said sensing means controlling the number of said machine cycles by selectively setting said driving means into one of three predetermined positions;

said sensing means being operative to additively engage said first register means to said second transfer means during the first machine cycle when sensing a 1; during both the first and second machine cycles when sensing a 2, 3 or 4; and during all of the first, second and third machine cycles when sensing a 5.

20. The calculator of claim 19 wherein said third means includes fourth means controlled by said sensing means for simultaneously driving said registers into additive engagement with said second transfer means when sensing a mult-member representing any digit from 2 to 8.

21. The calculator of claim 20 wherein said sensor means includes fifth means for additively engaging both of said register means with said second transfer means during said first machine cycle when sensing a mult-member representing a 2, 3, 4 or 5; and during both said first and second machine cycles when sensing a 4 or 5.

22. A calculator for performing multiplication comprising:

first settable means for selectively receiving a multi-digit multiplier and a multi-digit multiplicand;

manually operable keyboard means for sequentially entering the multiplier and the multiplicand in that order to set said settable means; said keyboard means further including function key means;

a plurality of slidable mult-members being movable into discrete positions for representing the digits of the multiplier;

first transfer means operable by said function key means for setting said mult-members in accordance with the multiplier in said first means;

second transfer means;

first and second movably mounted register means being normally disengaged from said second transfer means;

said second transfer means being releasably coupled to said first means when said multiplicand is stored therein for transferring said multiplicand to said registers;

sensing means for sequentially sensing the mult-members;

third means coupled to said sensing means for positioning said registers to make additive engagement with said second transfer means when said sensing means senses a mult-member representing a multiplier digit having a integer value between 1 and 5 and for positioning said registers to make subtractive engagement with said second transfer means when said sensing means senses a mult-member representing a multiplier digit having an integer value between 6 and 9;

multi-position driving means for driving said second transfer means to enter the multiplicand into said register means within three machine cycles;

said sensing means controlling the number of said machine cycles by selectively setting said driving means into one of three predetermined positions;

said sensing means being operative to additively engage said first register means to said second transfer means during the first machine cycle when sensing a 1; during both the first and second machine cycles when sensing a 2, 3 or 4; and during all of the first, second and third machine cycles when sensing a 5;

multi-position driving means for driving said second transfer means to enter the multiplicand into said register means within three machine cycles;

said sensing means controlling the number of said machine cycles by selectively setting said driving means into one of three predetermined positions;

said sensing means including further means being operative to subtractively engage said first register means to said second transfer means during the first machine cycle when sensing a 9, and during both the first and second machine cycles when sensing a 6, 7 or 8.

23. The calculator of claim 22 wherein said third means includes fourth means controlled by said sensing means for simultaneously driving said registers into subtractive engagement with said second transfer means when sensing a mult-member representing any digit from 6 to 8.

24. The calculator of claim 23 wherein said sensor means includes fifth means for subtractively engaging both of said register means with said second transfer means during said first cycle when sensing a mult-member representing a 6, 7 or 8; and during both said first and second machine cycles when sensing a mult-member representing a 6.

References Cited

UNITED STATES PATENTS

| | | | |
|---|---|---|---|
| 2,216,063 | 9/1940 | Brand et al. | 235—60 |
| 2,886,238 | 5/1959 | Plunkett | 235—63 |
| 2,952,406 | 9/1960 | Capellaro et al. | 235—63 |
| 3,005,585 | 10/1961 | Capellaro et al. | 235—63 |
| 3,145,923 | 8/1964 | Chall | 235—60 |

STEPHEN J. TOMSKY, *Primary Examiner.*